United States Patent [19]
Buzaglo et al.

[11] Patent Number: 6,058,395
[45] Date of Patent: May 2, 2000

[54] COMPUTERIZED COMMUNICATION SYSTEM FOR MANAGING MULTI-DISCIPLINARY ENGINEERING VIRTUAL COMMUNITY

[76] Inventors: Jacques Buzaglo, 7/27 Neot-Golda, Kiryat Nordau, Netanya; Avraham Gavrielovitch, 23 Tarshish Street; Ehud Polonsky, 12 Bernstein-Cohen Street, both of Ramat Hasharon, all of Israel

[21] Appl. No.: 09/015,309

[22] Filed: Jan. 29, 1998

[51] Int. Cl.[7] ................................................. G06F 17/30
[52] U.S. Cl. ................................................................ 707/10
[58] Field of Search ................................................ 707/10

[56] References Cited

U.S. PATENT DOCUMENTS

| | | | |
|---|---|---|---|
| 5,408,662 | 4/1995 | Katsurabajashi | 709/101 |
| 5,423,034 | 6/1995 | Cohen-Levy et al. | 707/10 |
| 5,428,729 | 6/1995 | Chang et al. | 345/331 |
| 5,513,126 | 4/1996 | Harkins et al. | 709/228 |
| 5,579,472 | 11/1996 | Kalyan et al. | 345/326 |
| 5,634,129 | 5/1997 | Dickinson | 709/303 |
| 5,796,393 | 8/1998 | MacNaughton et al. | 345/329 |
| 5,848,271 | 12/1998 | Caruso et al. | 709/300 |

OTHER PUBLICATIONS

"Framework Technologies Corporation", A Printout of: http://www.frametech.com/main.html, Mar. 25, 1998.
A press release appearing on the Internet at http://home.netscape.com/flash1/newsref/pr/newsrelease480.html. May 9, 1997.
Table of contents of a Software package called Worldgroup, marketed by GALACTICOM. Jul. 23, 1985.
A printout of http://www.bluelineonline.com/html/prd.info.html. Aug. 12, 1997.

*Primary Examiner*—Wayne Amsbury
*Attorney, Agent, or Firm*—Nixon & Vanderhye P.C.

[57] ABSTRACT

This invention discloses a computerized communication system for managing a multidisciplinary engineering virtual community engaged in a plurality of projects, the system including a directory display operative to display a directory of participants in a project to a user who has entered a project in which he is participating, and a communication manager operative to transmit a communication between the user and at least an individual one of the participants in the directory, in response to selection of at least one of the participants in the directory by the user.

58 Claims, 34 Drawing Sheets

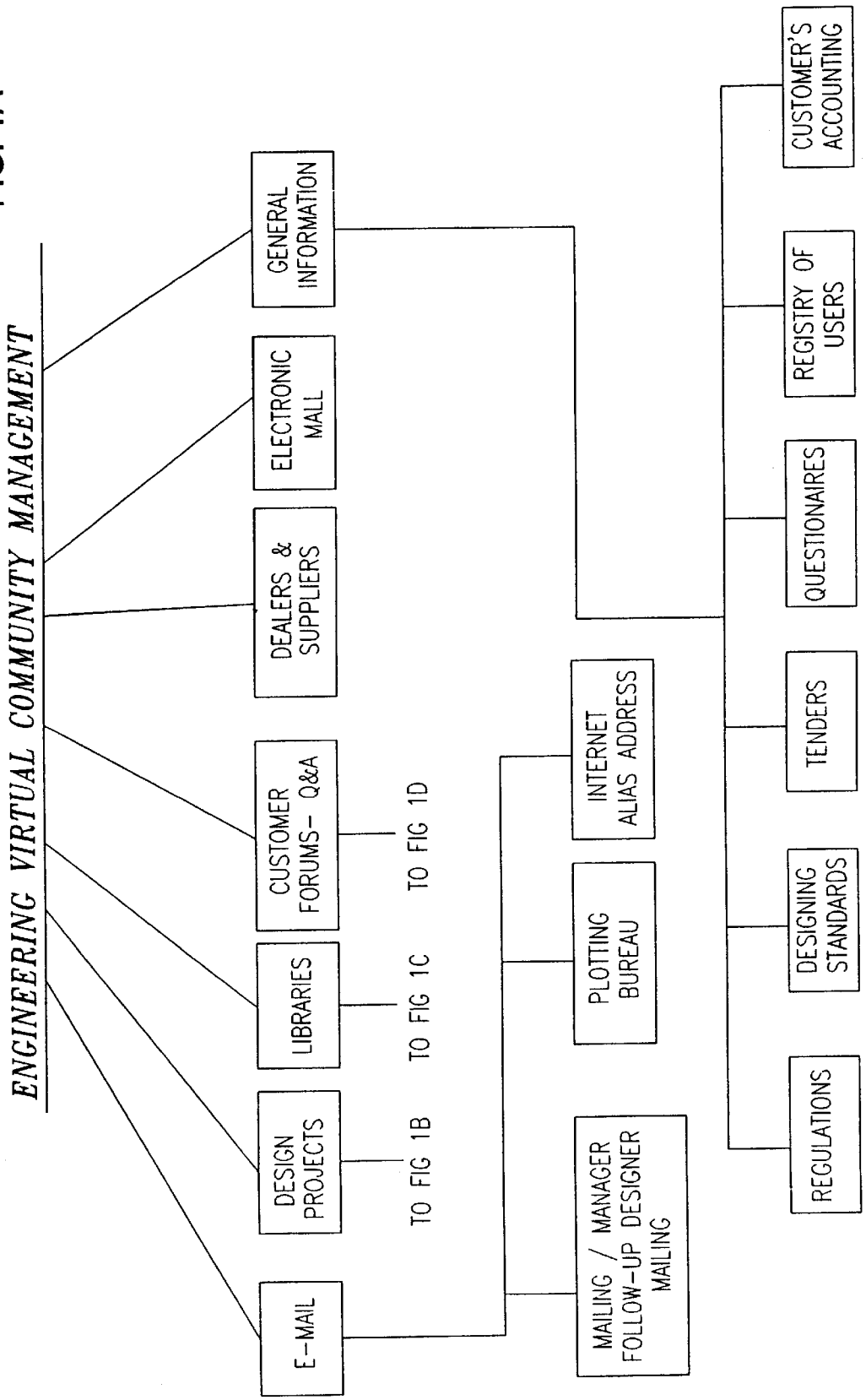

FROM 170 IN FIG. 2A

200 — Using suitable CAD s/w such as AutoCAD, Jacques enters the downloaded drawing file and adds a layer including his profession's contribution to the drawings. In course of work, Jacques requests system to display list of on-line users, notices that Udi is on-line and initiates an on-line chat in order to inform Udi that he will soon finish his part of the drawings.

210 — Jacques enters upload command with respect to the modified drawing file. Jacques keys in descriptive text saying that these are modified drawings which now await Udi's confirmation that modification is satisfactory.

220 — system associates descriptive text with drawings file

230 — jacques elects to send e-mail, selects Udi from directory display

240 — Jacques sends e-mail to Udi, cc Michael, saying that drawings have been modified and suggesting a teleconference between Jacques, Udi and Michael about modifications in two hour's time.

250 — Since Jacques selected "return receipt" option, communication manager confirms to Jacques that e-mail has been downloaded by Udi and by Michael

265 — Jacques elects to "clean-up" his drawer by deleting a file which is obsolete -- optionally project manager's authorization is required for deletions.

TO 270 IN FIG. 2C

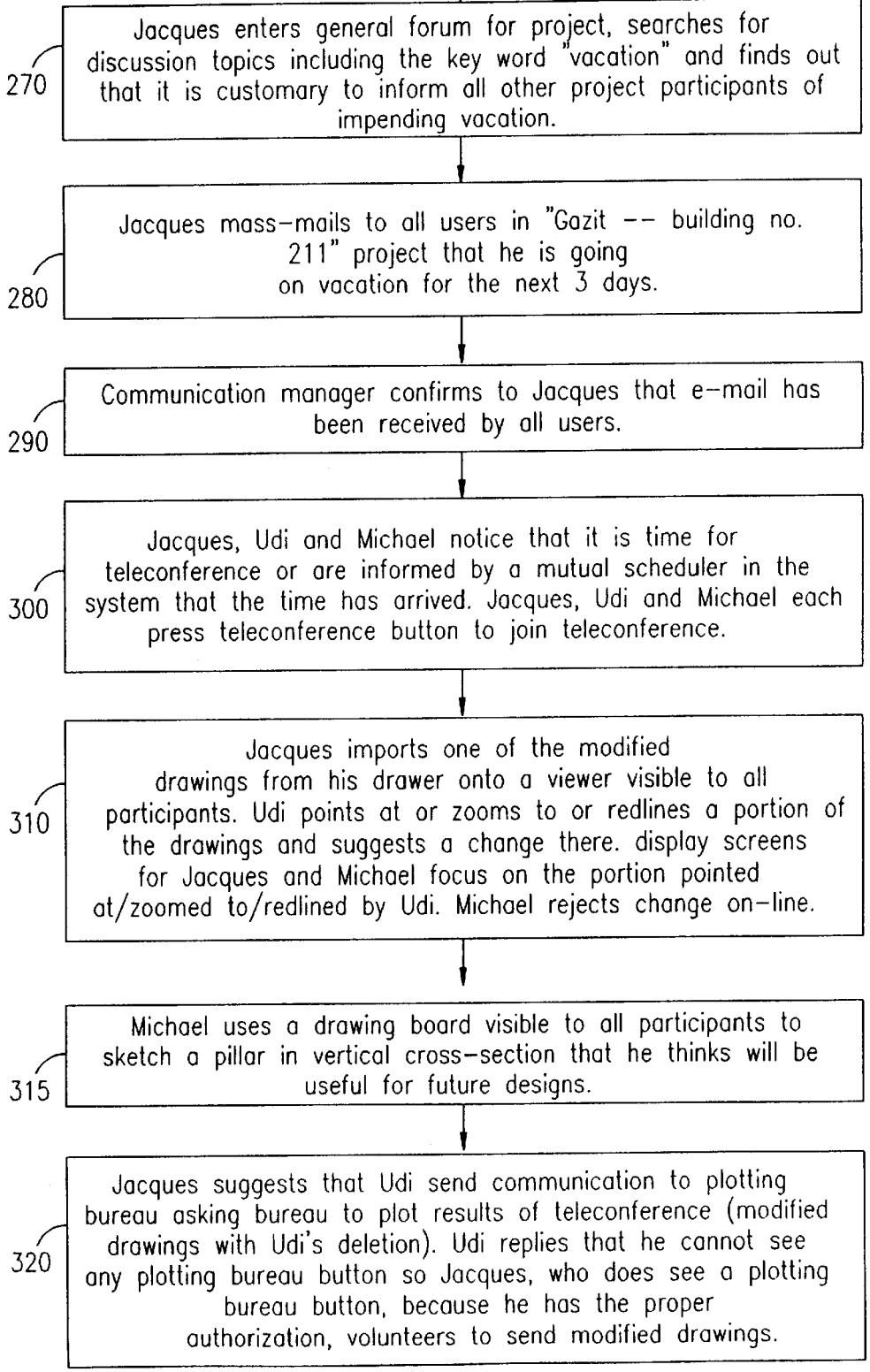

COMPUTERIZED COMMUNICATION SYSTEM FOR MANAGING MULTI-DISCIPLINARY ENGINEERING VIRTUAL COMMUNITY

FIELD OF THE INVENTION

The present invention relates to apparatus and methods for computerized engineering applications.

BACKGROUND OF THE INVENTION

A press release appearing on the Internet at http://home.netscape.com/flash1/newsref/pr/newsrelease480.html describes an online service that brings together software, content and community resources which is intended to serve professionals wishing to easily access and personalize online business resources from a single central location.

The system described includes:
a. customizable services that bring business users easy, central access to news and information and leverage the features of Netscape Communicator,
b. services which enable communication and collaboration between professionals and business, and
c. services that make it easy for users to easily update and maintain the leading-edge software they need to take full advantage of the Internet and Intranets.

The system includes Concentric's Netscape Virtual Office and software.net's Netscape Software Depot.

BBS (bulletin board service) is an almost extinct service which at one time, before the Internet became prevalent, was very useful for computer users with a common interest. The service was provided modem-to-modem communication, using which users would call up a BBS provider, browse through information at the BBS site and download portions of that information through modem. If a BBS service had more than one telephone line, it was possible for subscribers to chat with one another.

The disclosures of all publications mentioned in the specification and of the publications cited therein are hereby incorporated by reference.

SUMMARY OF THE INVENTION

The present invention seeks to provide systems and methods for managing a virtual community of engineers.

There is thus provided, in accordance with a preferred embodiment of the present invention, a computerized communication system for managing a multidisciplinary engineering virtual community engaged in a plurality of projects, the system including a directory display operative to display a directory of participants in a project to a user who has entered a project in which he is participating, and a communication manager operative to transmit a communication between the user and at least an individual one of the participants in the directory, in response to selection of at least one of the participants in the directory by the user.

This system may be implemented, for example, on a platform having modules which optionally cooperate with one another such as a platform based on Galacticom's WorldGroup software system.

Further in accordance with a preferred embodiment of the present invention, the communicator is operative to transmit a communication, such as an electronic mail communication, from the user to a selected one of the participants.

Further in accordance with a preferred embodiment of the present invention, the communicator is operative to transmit a communication from a selected one of the participants to the user.

These features may be implemented, for example, based on the Message Center module of Galacticom's WorldGroup software system.

Further in accordance with a preferred embodiment of the present invention, the communication is transmitted by providing the user with access to a drawer of the selected one of the participants. This feature may be implemented, for example, based on the File Library module of Galacticom's WorldGroup software system.

Also provided, in accordance with another preferred embodiment of the present invention, is a computerized communication system for managing a multidisciplinary engineering virtual community engaged in a plurality of projects, the system including an archive including a plurality of drawers associated with each of a plurality of users, an uploader operative to upload a file generated by an individual user only to the drawer associated with the individual user, and a downloader operative to download a file from any individual one of the plurality of drawers.

The system is preferably based on client server architecture.

Additionally in accordance with a preferred embodiment of the present invention, the archive includes project archives for each of at least two projects, each project archive including a plurality of drawers for each of a corresponding plurality of participants in the project, and wherein the downloader is operative to download a file from a drawer within a project archive of a particular project only upon request of a participant in the particular project.

These features may be implemented, for example, by defining suitable user authorizations and defining keys on a project page, and using the File Library, Menu Editor and Hypermedia Editor modules of Galacticom's WorldGroup software system and defining suitable classes and keys.

Further in accordance with a preferred embodiment of the present invention, the directory includes an indication of functions fulfilled by each participant in the project.

Still further in accordance with a preferred embodiment of the present invention, the system also includes an authorization facility authorizing only users participating in a project to enter that project. This feature may be implemented, for example, by defining suitable user authorizations and defining keys on project pages, and using the Menu Editor and Hypermedia Editor modules of Galacticom's WorldGroup software system and defining suitable classes and keys.

Additionally in accordance with a preferred embodiment of the present invention, the communication manager is also operative to transmit a communication from the user to all of the participants in the directory, in response to a mass-mailing command by the user.

Further in accordance with a preferred embodiment of the present invention, the communication manager is operative to transmit technical drawings of substantially any commonly used size, by electronic mail.

Still further in accordance with a preferred embodiment of the present invention, the communication manager includes a receipt confirmation generator operative to provide an indication to the user that the selected participant has received the electronic mail communication.

These features may be implemented, for example, based on the Message Center module of Galacticom's WorldGroup software system.

Further in accordance with a preferred embodiment of the present invention, the communication manager is implemented in software and the participant uses participant software and wherein the communication manager is operative to push updates of at least some software elements toward each individual one of the participants such that, upon termination of contact between the communication manager and any participant, the participant's software elements are as updated as the communication manager's software elements.

This feature may be implemented, for example, based on Galacticom's WorldGroup software server system.

Further in accordance with a preferred embodiment of the present invention, the system also includes at least one forum in which participants raise discussion topics and receive responses from one another and wherein the forum includes a search engine enabling an individual participant to search the discussion topics and responses according to a participant-defined search key. This feature may be implemented, for example, based on the Forums module of Galacticom's WorldGroup software system.

Preferably, queries can be posed within the Forum and within the File Library.

Further in accordance with a preferred embodiment of the present invention, the communication manager includes a teleconferencing manager.

Still further in accordance with a preferred embodiment of the present invention, the teleconferencing manager is operative to provide a drawing board for an individual teleconference and wherein the participants in the individual teleconference all draw on the drawing board during the teleconference and wherein a drawing made on the drawing board by any one participant during the teleconference is seen on-line by the other participants during the teleconference.

These features may be implemented, for example, based on the Teleconference module of Galacticom's WorldGroup software system.

Further in accordance with a preferred embodiment of the present invention, the communication manager operates in accordance with a user-selected one of the following communication modes: direct dial-up, dial-up via a local telephone service provider's gateway, and Internet.

These features may be implemented, for example, based on the Manager module of Galacticom's WorldGroup software system.

Further in accordance with a preferred embodiment of the present invention, the display is also operative to display an indication of at least a portion of the members of the virtual community who are currently on-line and wherein the communication manager is operative to set up a chat session between the user and an individual member of the virtual community who is currently on-line, in response to selection of the individual member by the user. This feature may be implemented, for example, based on the Users Online paging method in the Client module of Galacticom's WorldGroup software system.

Preferably, the display is also operative to display an indication of at least a portion of the members of the virtual community who are currently on-line and wherein the communication manager is operative to set up a chat session between the use and an individual member of the virtual community who is currently on-line, in response to selection of the individual member by said user.

These features may be implemented, for example, by defining suitable user authorizations and defining keys on a project page, and using the File Library, Menu Editor and Hypermedia Editor modules of Galacticom's WorldGroup software system and defining suitable classes and keys.

Preferably, the uploader includes a file identifier operative to associate a descriptive text generated by a user with an individual file to be uploaded, thereby to allow a user to generate a descriptive text including a description characterizing the individual file to be uploaded. This feature may be implemented, for example, based on the File Library module of Galacticom's WorldGroup software system.

Further in accordance with a preferred embodiment of the present invention, one of the participants is a plotting bureau and different participants have different levels of authorization regarding communications with the plotting bureau and the communication manager is operative to transmit a particular communication from a particular participant to the plotting bureau only if the particular participant is authorized to transmit the particular communication. This feature may be implemented, for example, based on the Message Center module of Galacticom's WorldGroup software system.

Further in accordance with a preferred embodiment of the present invention, the communication includes an electronic mail communication. This feature may be implemented, for example, based on the Message Center module of Galacticom's WorldGroup software system.

Still further in accordance with a preferred embodiment of the present invention, the authorization facility includes a flexible authorization facility which is modifiable by a system operator to implement different authorization schemes for different projects. This feature may be implemented, for example, by suitable user definitions based on the Menu Editor and Hypermedia Editor modules of Galacticom's WorldGroup software system and defining suitable classes and keys.

Further in accordance with a preferred embodiment of the present invention, the communication manager is operative to provide electronic mail service allowing a user of the system who is not an Internet subscriber to communicate back and forth with an individual who is an Internet subscriber but is not a user of the system. These features may be implemented, for example, based on the Message Center module of Galacticom's WorldGroup software server system.

Further in accordance with a preferred embodiment of the present invention, the system also includes a library of computerized resources accessible by all members of the virtual community. This feature may be implemented, for example, based on the File Library module of Galacticom's WorldGroup software server and client system.

Further in accordance with a preferred embodiment of the present invention, the downloader is operative, in the event of disconnection while downloading a file and subsequent reconnection, to download, following the reconnection, only portions of the file which were not downloaded before the disconnection. This feature may be implemented, for example, based on the Message Center and File Library modules of Galacticom's WorldGroup software server system.

Also provided, in accordance with another preferred embodiment of the present invention, is a computerized communication system for managing a multidisciplinary engineering virtual community engaged in a plurality of projects, the system including an archive including a plurality of drawers for each of a plurality of users and a data flow controller operative to govern traffic of files to the drawers in accordance with a data flow scheme.

Further in accordance with a preferred embodiment of the present invention, the data flow scheme is system-defined. Alternatively, the data flow scheme for each individual project may be custom-defined. These features may be implemented, for example, by defining suitable user authorizations and defining keys on a project page, and using the File Library, Menu Editor and Hypermedia Editor modules of Galacticom's WorldGroup software system and defining suitable classes and keys.

Preferably, the system of the present invention is based on client server architecture.

The term "engineering virtual community" refers to a virtual community which includes individuals and entities related to at least the following fields: architecture, engineering, construction, infrastructure and mechanics, including but not limited to individuals and entities practicing the following arts: project managers, developers, contractors, architects, engineers, electric designers, plumbing designers, elevator designers, HVAC designers, garden designers, product and industrial designers, draftsmen, plotting bureaus, GIS and mapping companies, vendors and suppliers to these sectors, data owners (including but not limited to governments, municipalities and international development organizations).

The term "drawer" refers to a virtual drawer.

BRIEF DESCRIPTION OF THE DRAWINGS

The present invention will be understood and appreciated from the following detailed description, taken in conjunction with the drawings in which:

FIGS. 1A–1D, taken together, form a simplified hierarchical diagram of a engineering project managing system constructed and operative in accordance with a preferred embodiment of the present invention;

FIGS. 2A–2C, taken together, form a simplified sequence-of-events diagram showing an example of the use of the system of FIG. 1 from the point of view of a user, Jacques.

DETAILED DESCRIPTION OF PREFERRED EMBODIMENTS

Figure 1B:
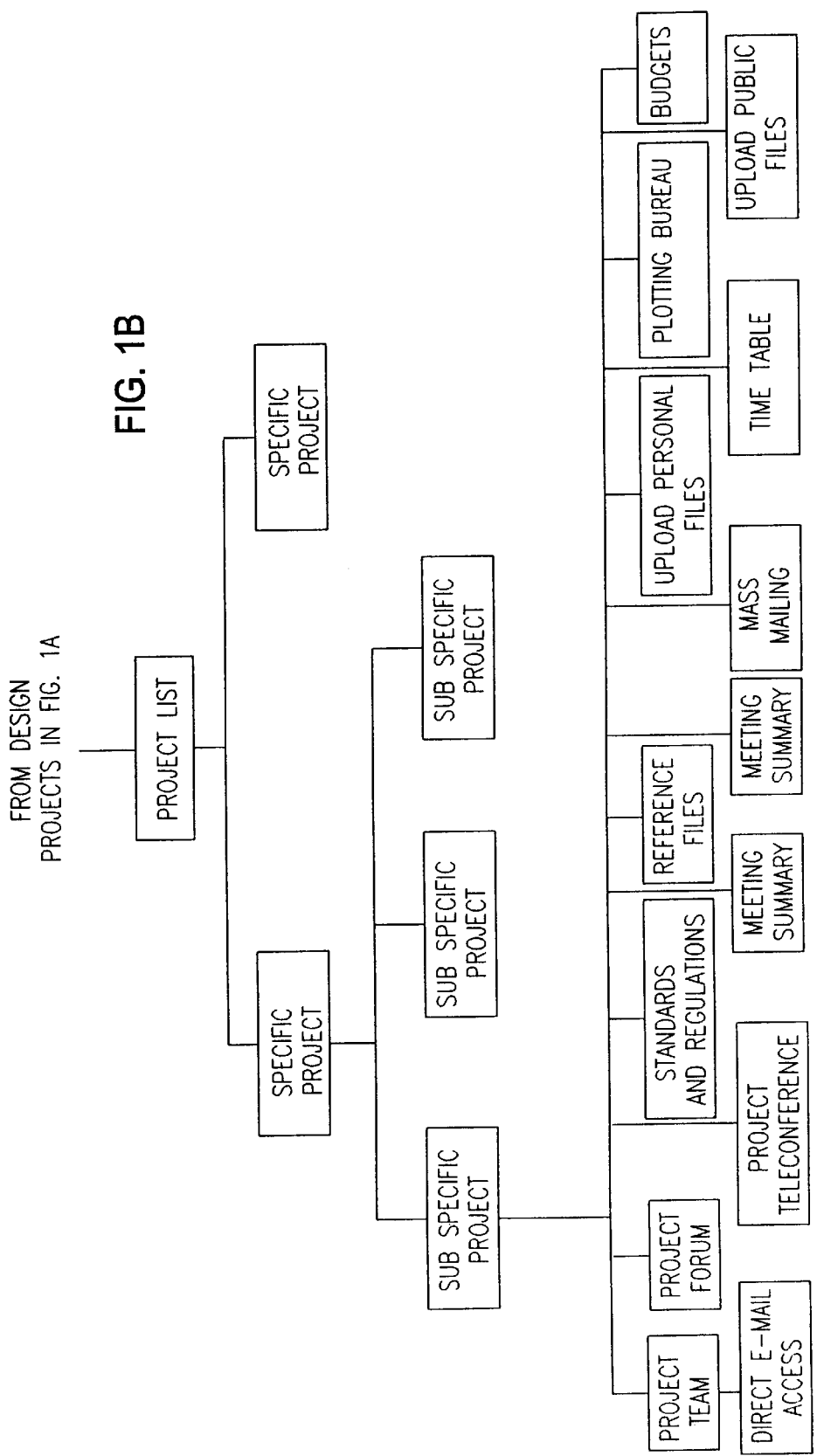
Figure 1C:
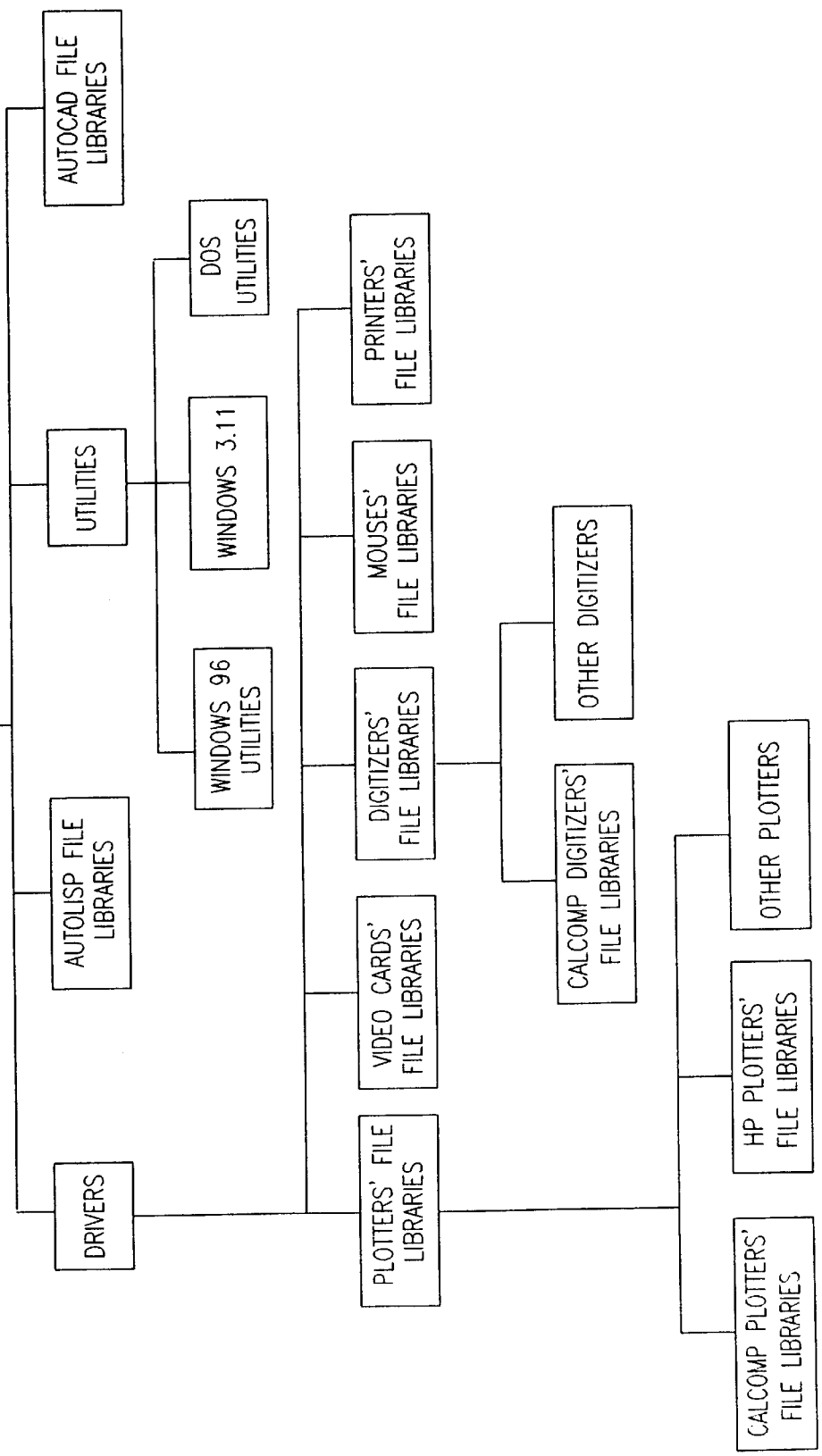
Figure 1D:
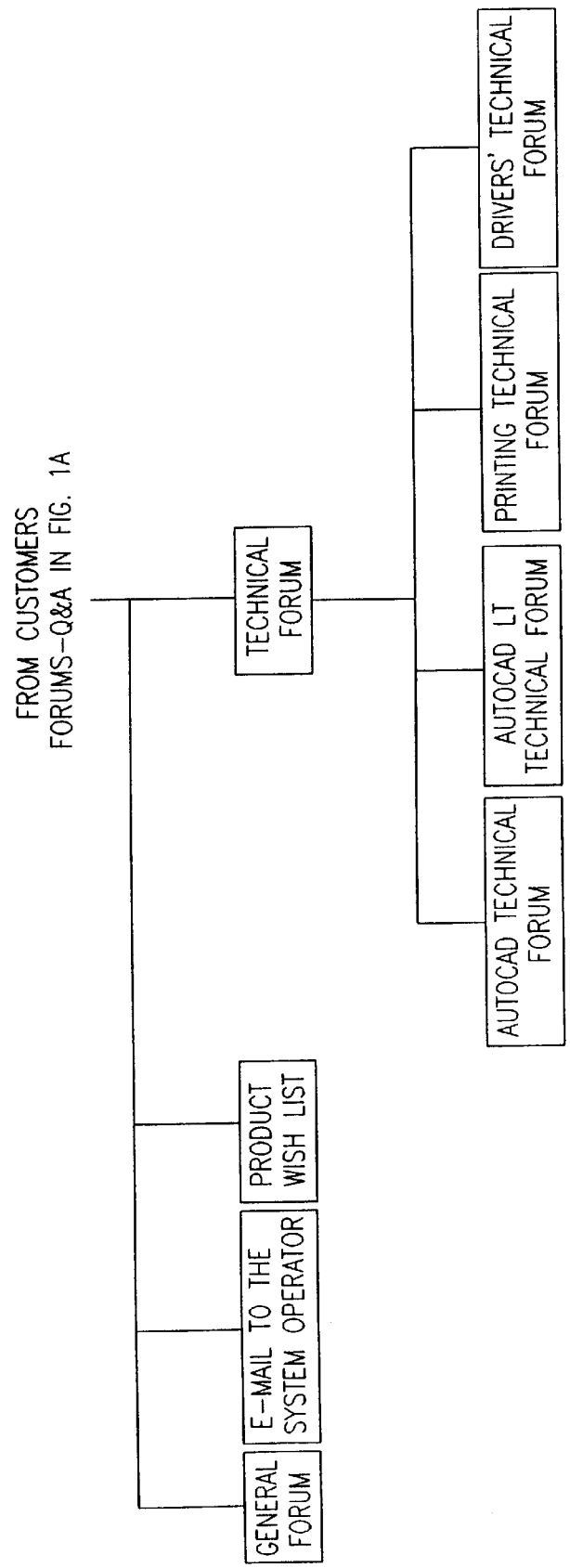

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIGS. 1A–1D, taken together, form a simplified hierarchical diagram of a engineering project managing system constructed and operative in accordance with a preferred embodiment of the present invention. The system of FIG. 1 may, for example, be implemented based on a client including a Galacticom WorldGroup server including the following Galacticom WorldGroup modules:

A. Questionnaires;
B. Message Center (useful in implementing system units such as but not limited to the following functional units: Mailing/Manager follow up, Designer Mailing, Plotting Bureau, Direct E-mail Access, Project Forum, Meeting Summary, Mass Mailing, General Forum, E-Mail to System Operator, AutoCAD Technical Forum, AutoCAD LT Technical Forum, Drivers' Technical Forum, Printing Technical Forum, Product Wish List)
C. File library, also termed herein "drawer" or "virtual drawer". (useful in implementing system units such as but not limited to Project Team, Standards and Regulations, Reference Files, Upload Personal Files, Plotting Bureau, Timetable, Budgets, Upload public files, and the following File Libraries: AutoLISP, AutoCAD, Video Cards, Mouses, Printers, Calcomp plotters, HP Plotters, Other Plotters, Calcomp Digitizers, Other Digitizers, Windows 95 Utilities, Windows 3.11 Utilities, DOS Utilities, Tenders, Designing Standards, Regulations).
D. Teleconference;
E. Internet Aliasing. This unit assigns a typically user-selected Internet alias to each user of the system. This allows a user of the system who is not an Internet subscriber to communicate back and forth with an individual who is an Internet subscriber but is not a user of the system.
F. Menu Editor—used to generate the hierarchy of FIG. 1;
G. Registry of Users (Users Registry);
H. Customer's Accounting
I. Hypermedia Editor—used to generate user interface elements such as menus and buttons.

According to a preferred embodiment of the present invention, the system includes functionalities serving a virtual engineering community which are outside the scope of project management functionalities. Preferably, for example, the system enables virtual community members to perform at least some or all of the following functionalities:

a. receive services from service providers such as dealers and suppliers,
b. download software (such as, but not limited to, drivers and routines) and data (such as, but not limited to, regulations and designing standards) from resource file libraries serving the virtual community,
c. participate in discussion forums, and
d. send and receive messages to/from other members of the virtual community or to/from Internet subscribers, either by Internet e-mail or by internal system e-mail.

Preferably, a suitable authorization scheme is provided –+ which, for example, authorizes only users participating in a project or having access rights to a project, to enter that project. Alternatively or in addition, any other element or unit of the system may be selectively authorizable, i.e. access of individuals to that element or unit is controllable by the system, either in accordance with a system-defined authorization scheme or in accordance with a system-operator defined authorization scheme.

Figure 2A:
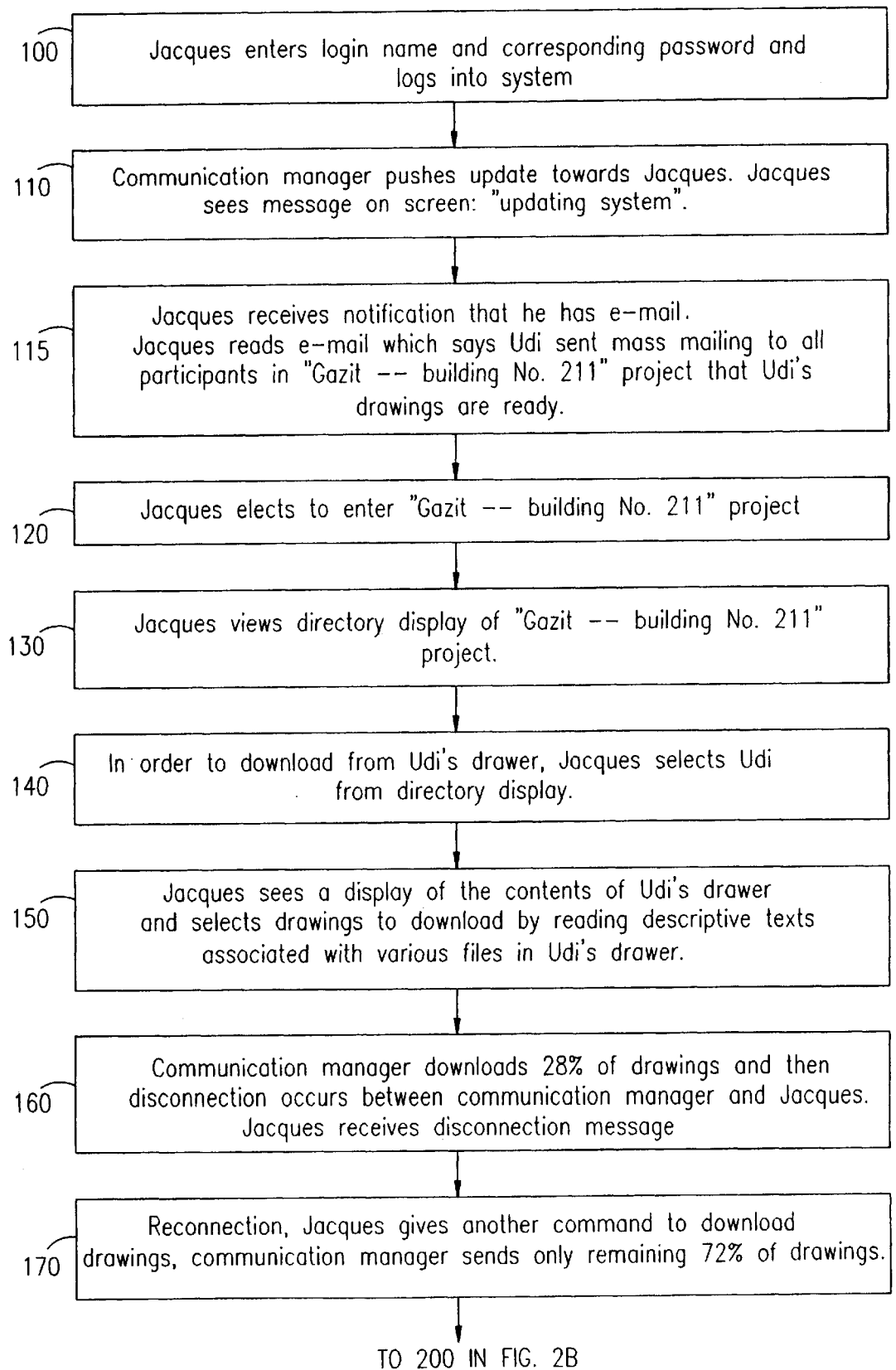

FIGS. 2A–2C, taken together, form a simplified sequence-of-events diagram showing examples of use of the system of FIG. 1 from the point of view of a user, Jacques. It is appreciated that the example sequence of FIGS. 2A–2C is not intended to be limiting and the screen displays of FIGS. 3–30 are also not intended to be limiting since other user interfaces can, of course, be designed without significantly changing the ease of use and range of virtual engineering community functionalities provided in the illustrated embodiment.

Figure 3:
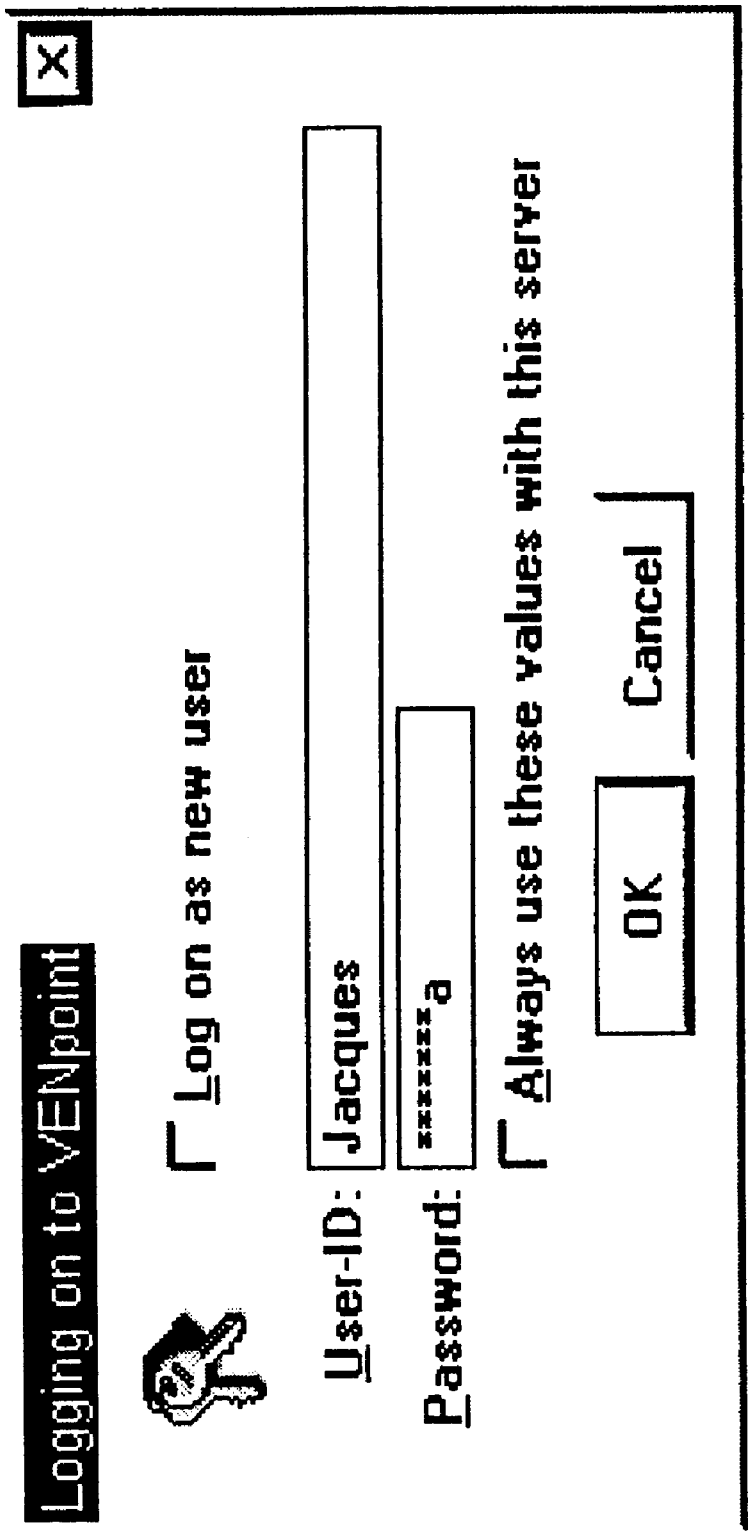
FIGS. 3–30 are simplified pictorial illustrations of screen displays which may be generated by the engineering project managing system of FIG. 1.

In step 100, a user called Jacques enters his login name and corresponding password and logs into the system. FIG. 3 is an example of a suitable login screen.

In step 110, the communication manager pushes a software update toward Jacques. Jacques sees a suitable message on the screen such as "updating system".

Figure 4:
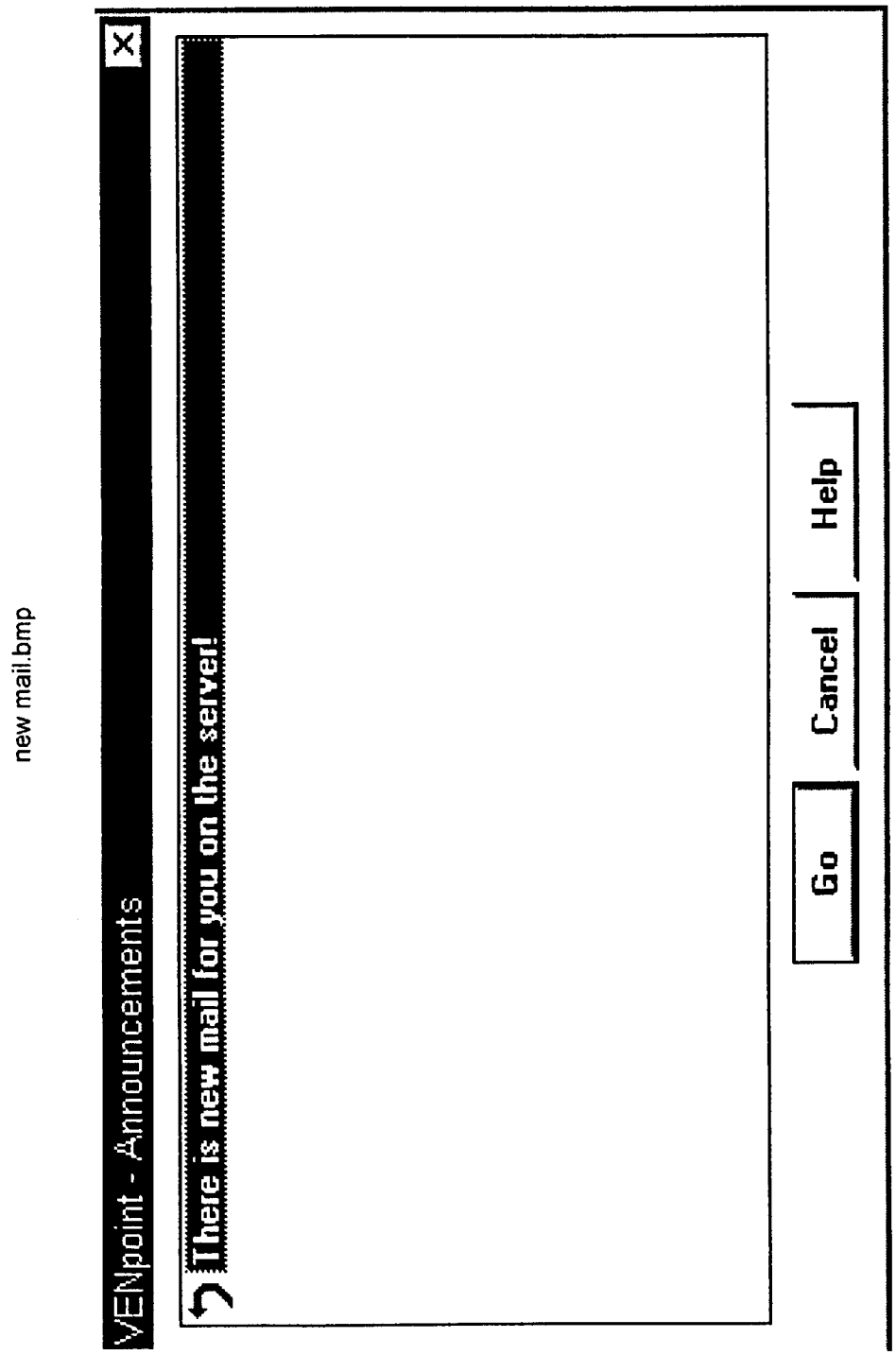
Figure 5:
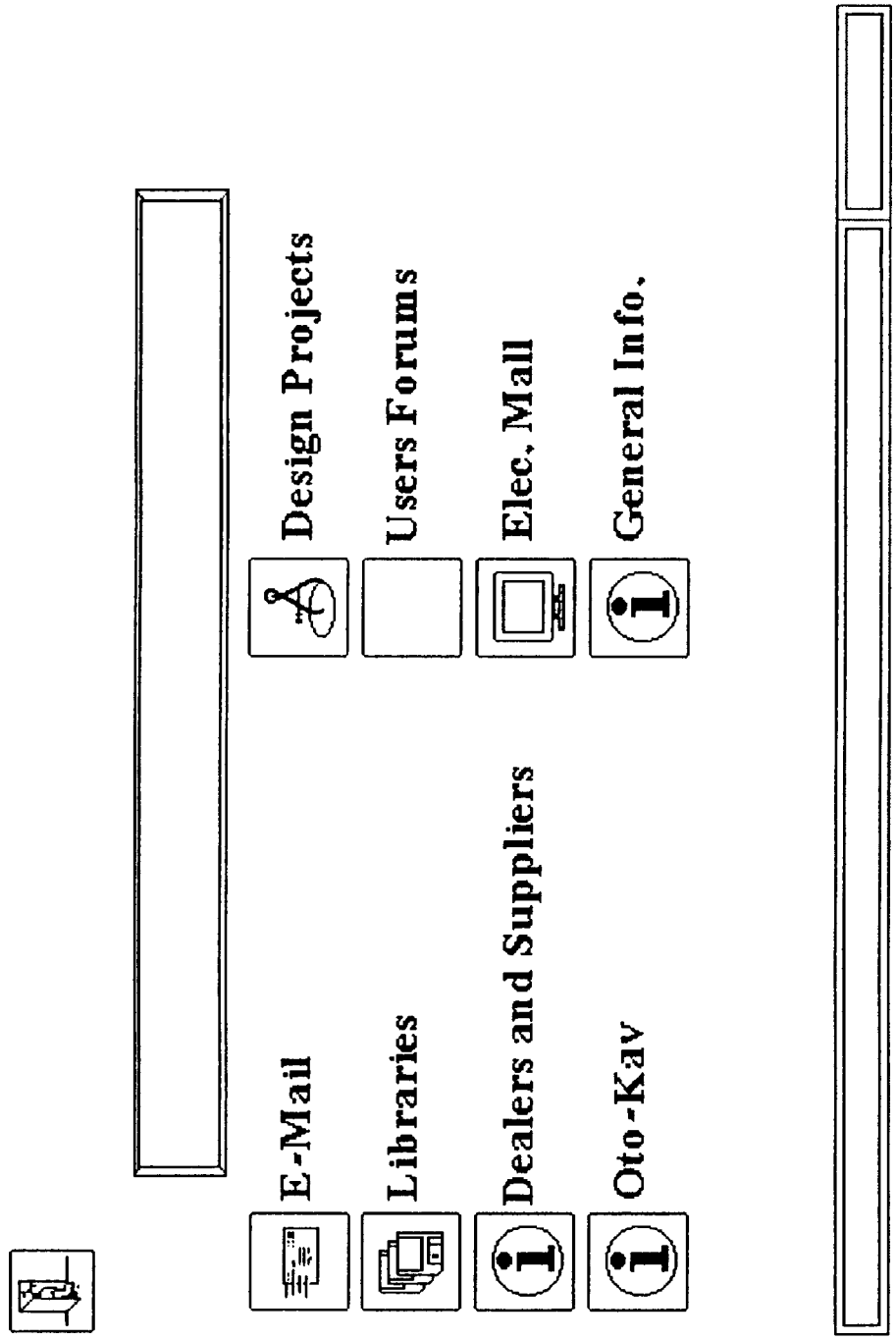

In step 115, Jacques receives notification that he has received an e-mail message. FIG. 4 is an example of a screen display which the system may provide. Jacques reads the e-mail which has been mass mailed by Udi to all participants (including Jacques) in a project called the "Gazit—building No. 211" project. The mass-mailed e-mail announces that Udi's drawings are ready.

Figure 6:
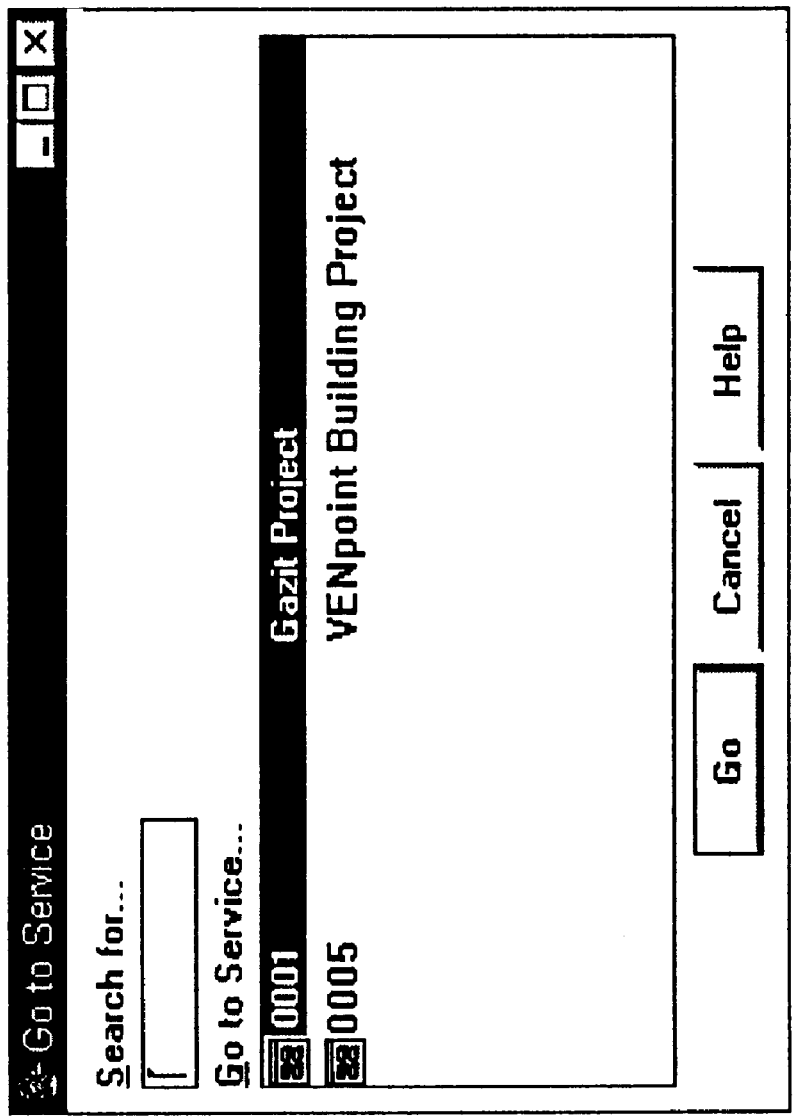
Figure 7:
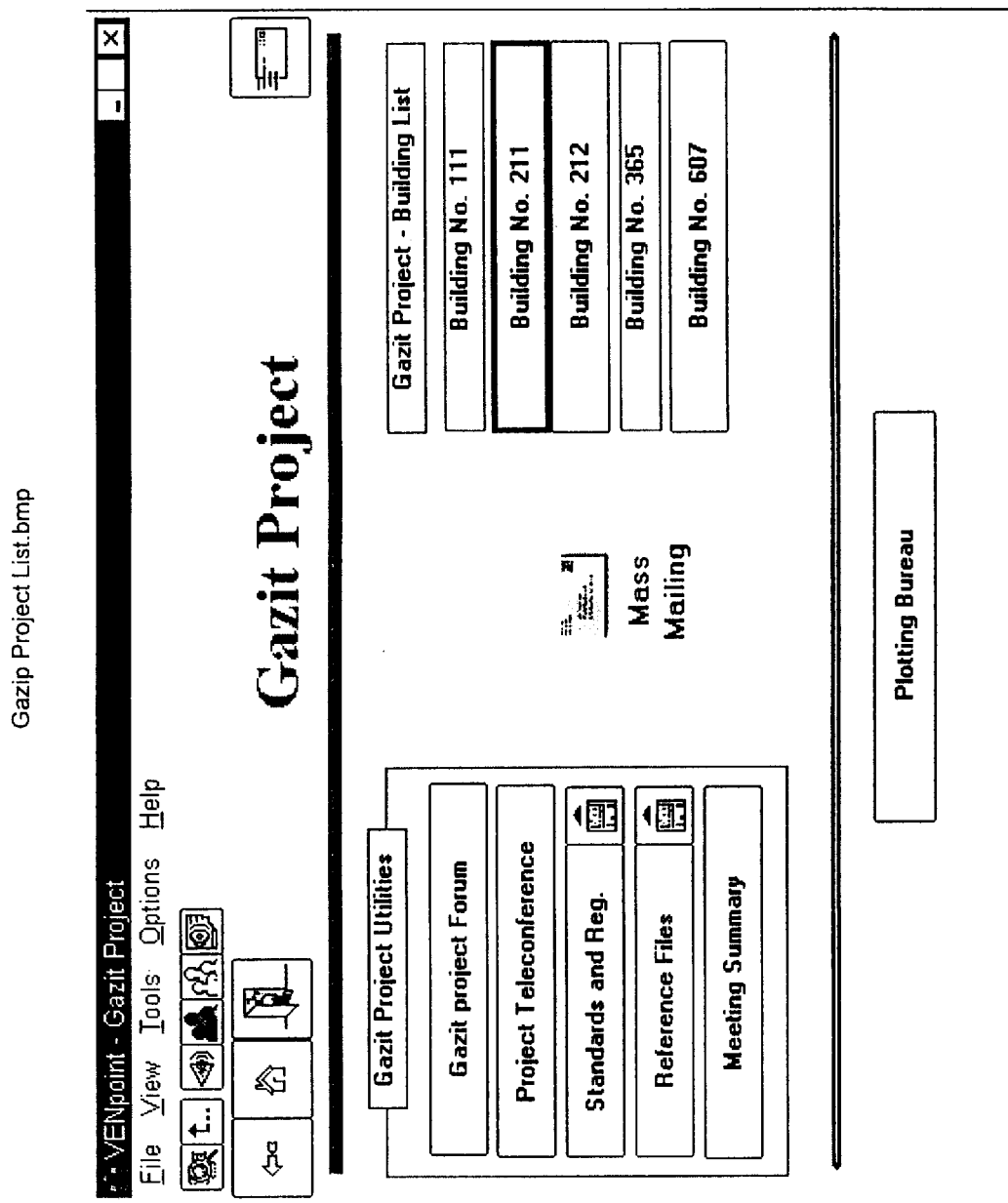

In step 120, Jacques uses a main menu (e.g. as shown in the screen display of FIG. 5) to elect to enter the "Gazit—building No. 211" project. This is done by selecting the "design projects" option responsive to which a screen display of projects in which Jacques is a participant, appears, such as the screen display of FIG. 6. In FIG. 6, as shown, the Gazit project is selected by Jacques, and as a result, the screen display of FIG. 7 appears which is a main screen for the Gazit project including several sub-projects. Jacques selects the "Building No. 211" subproject and in response the system generates a screen display of modules within the "Gazit—Building No. 211" project as shown in FIG. 8.

Figure 8:
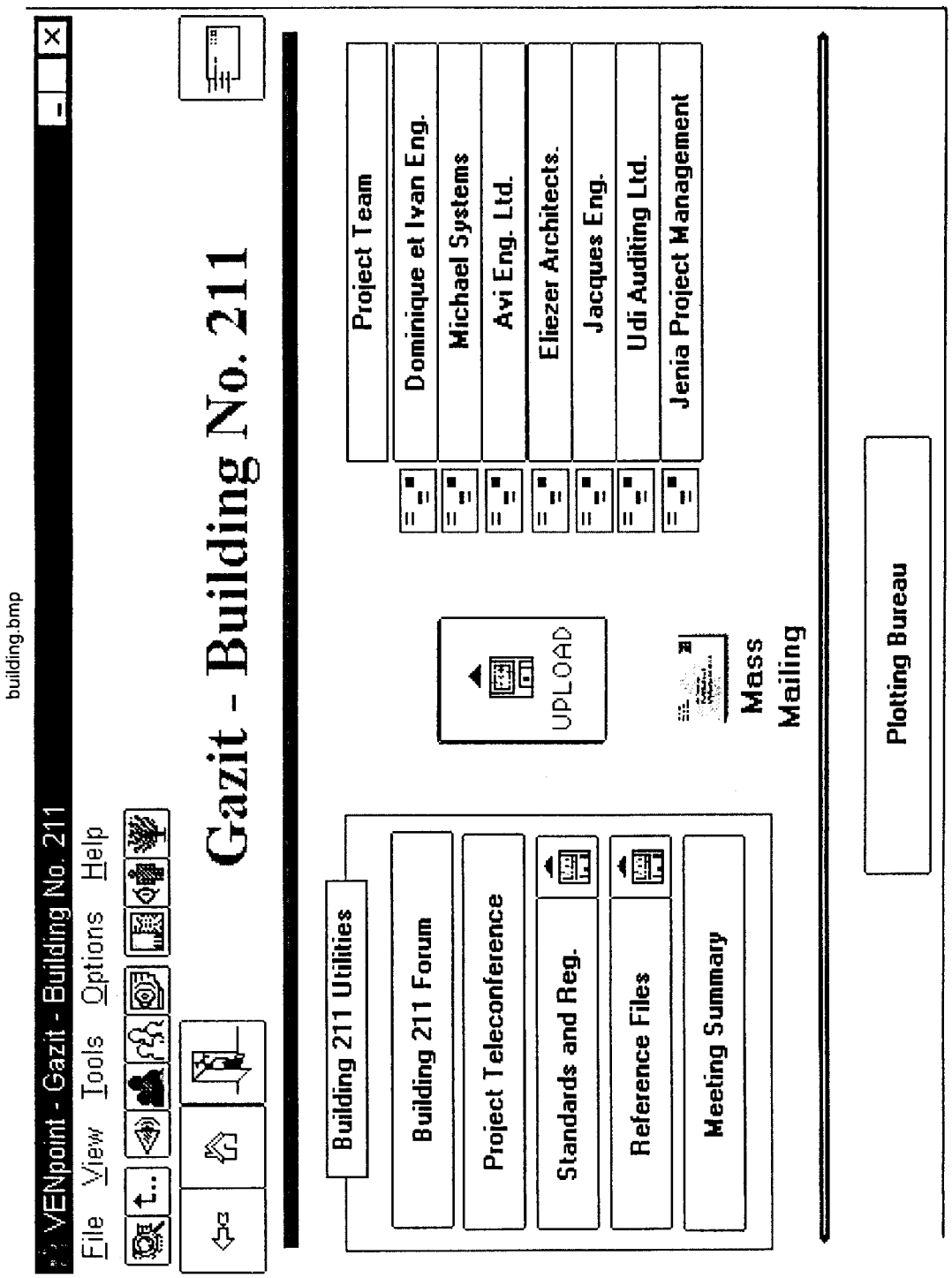

In step 130, Jacques views the directory display of the "Gazit—building No. 211" project (FIG. 8). As shown, each of a plurality of participants within the project has a virtual drawer. In step 140, Jacques performs a download from Udi's drawer. To do this, Jacques selects "Udi Auditing Ltd." from the directory display of FIG. 8.

Figure 9:
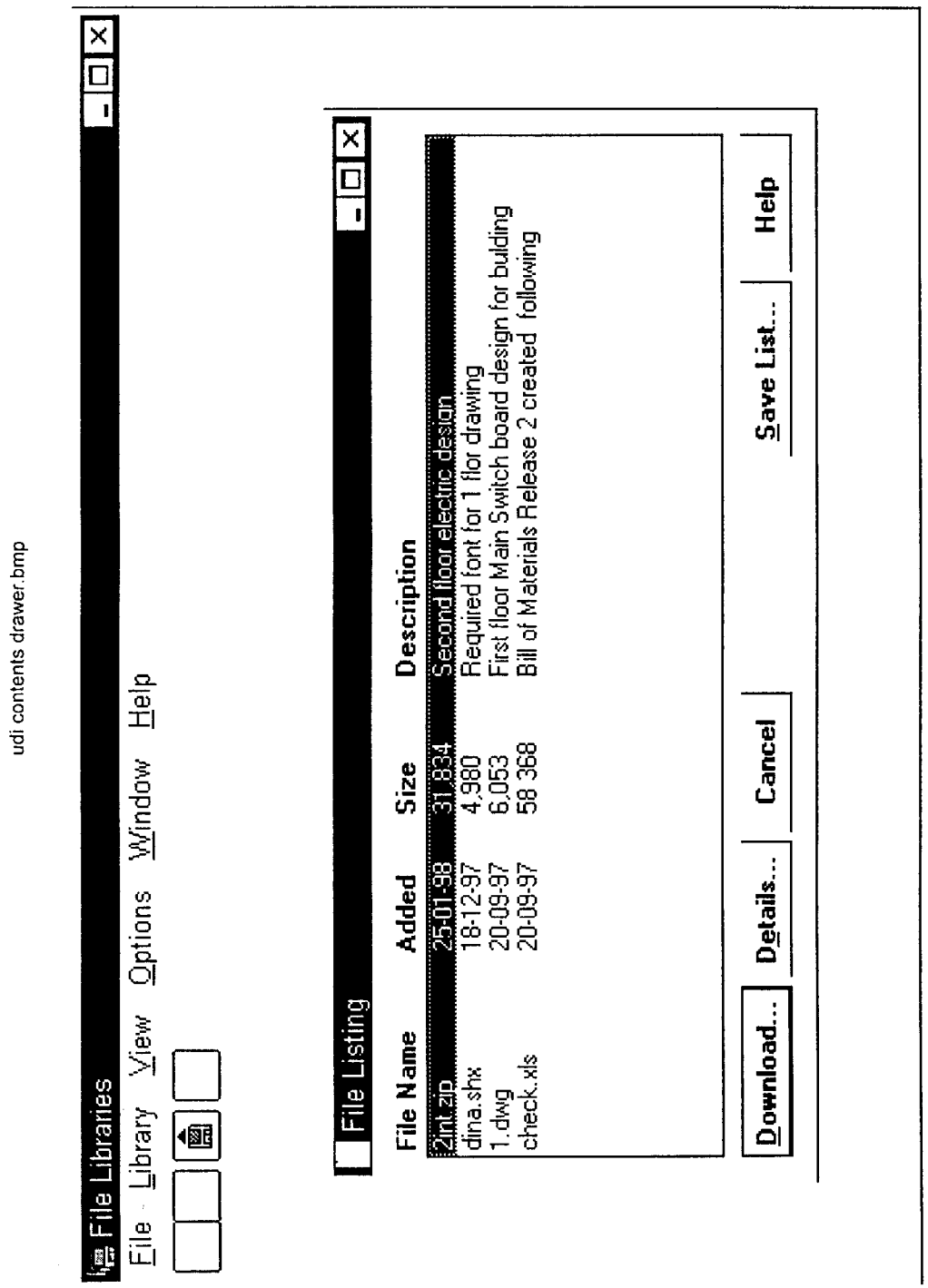
Figure 10:
Figure 11:
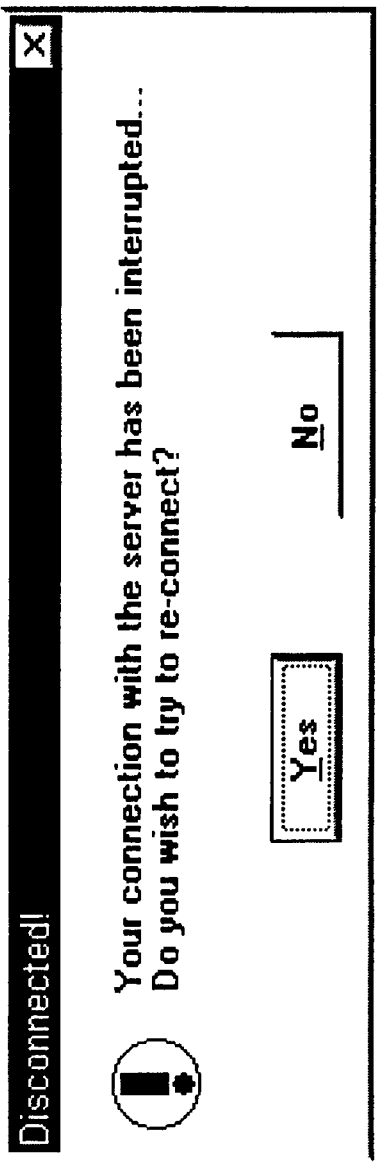

In response, the system generates a display screen which displays the contents of Udi's drawer (FIG. 9). This display screen is viewed by Jacques (step 150) and Jacques selects drawings to download by reading descriptive texts associated with the various files in Udi's drawer. Preferably, as shown in FIG. 9, the screen display which lists the contents of Udi's drawer includes, for each file, a one-line representation of the descriptive text for that file such as the first line of the descriptive text. The full descriptive text is available, in the illustrated embodiment, by pressing "Details" in the screen display of FIG. 9.

In step 160, the system's communication manager downloads 28% of the drawings and then disconnection occurs between the communication manager and Jacques. Jacques receives a suitable disconnection message. Jacques's screen preferably displays downloading progress. For example, just before disconnection occurs, Jacques may see the screen display of FIG. 10. When disconnection occurs, Jacques's screen may provide the display of FIG. 11. If reconnection is requested and succeeds, and if Jacques requests that the downloading operation be resumed (step 170), the communication manager preferably does not resend all of the drawings but instead sends only the remaining 72% of drawings. Therefore, the screen display that Jacques sees upon reconnection is typically, once again, the screen display of FIG. 10. This screen display is typically seen as soon as the communication manager has compared the data that has already been downloaded (which typically resides in Jacques's hard disk) with the file to be downloaded.

In step 200, Jacques uses suitable CAD software such as AutoCAD to enter the downloaded drawing file. Inside the file, Jacques adds a layer including his profession's contribution to the drawings.

Figure 12:
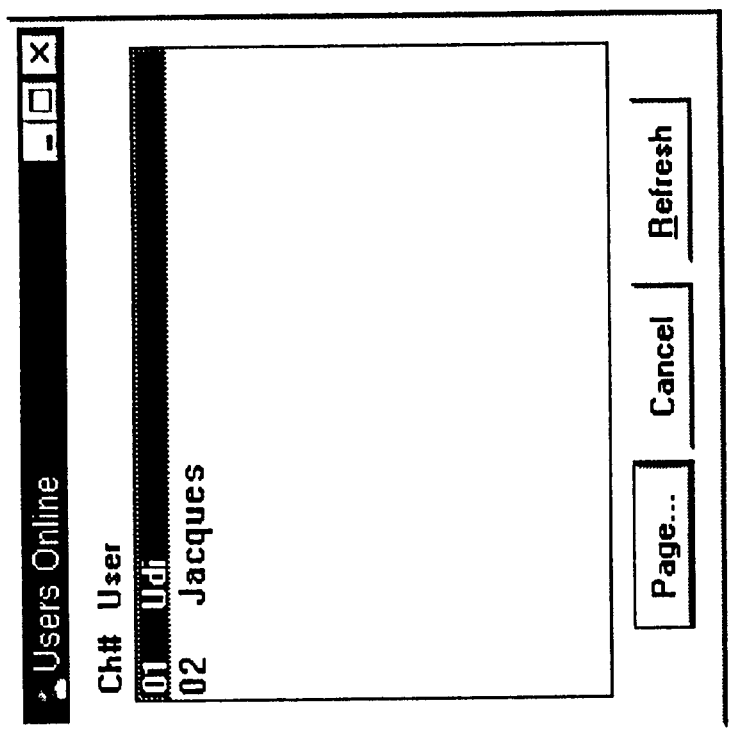
Figure 13:
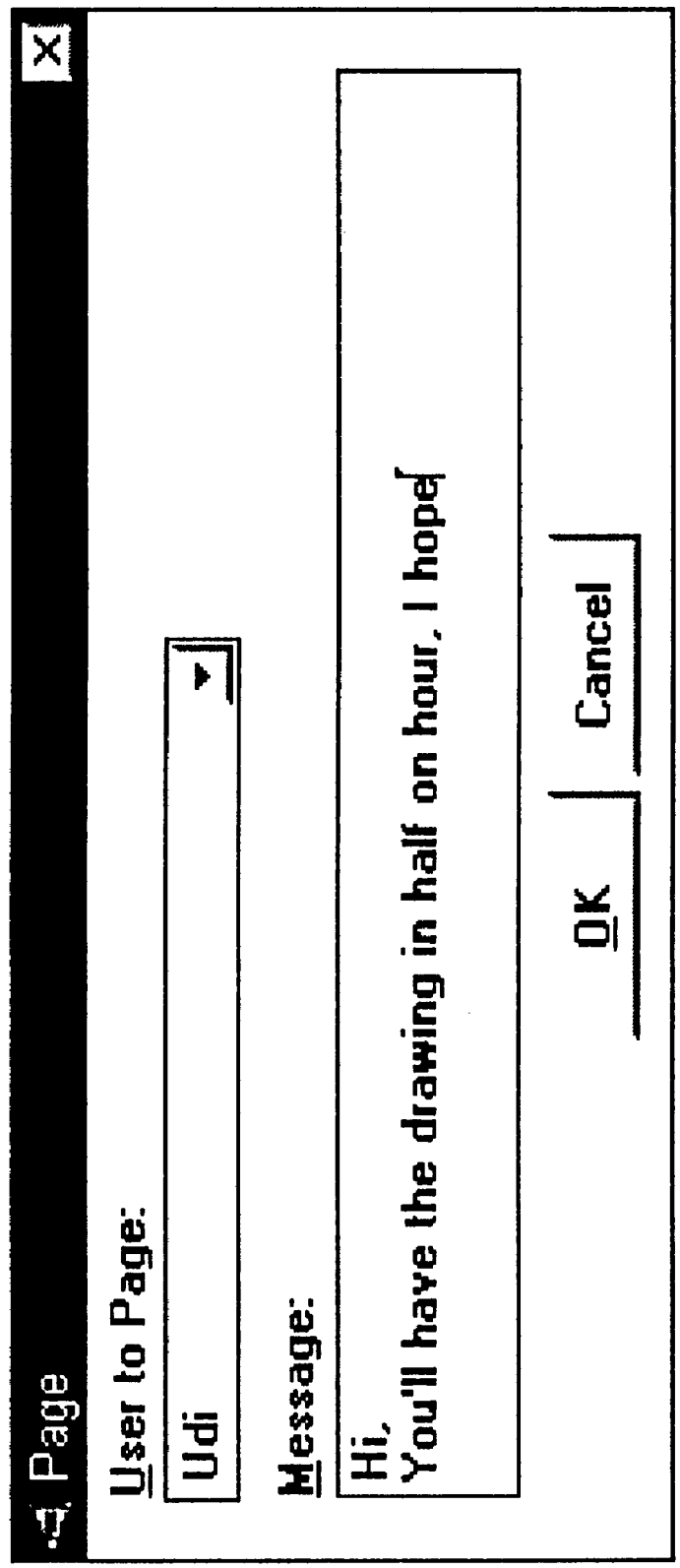
Figure 14:
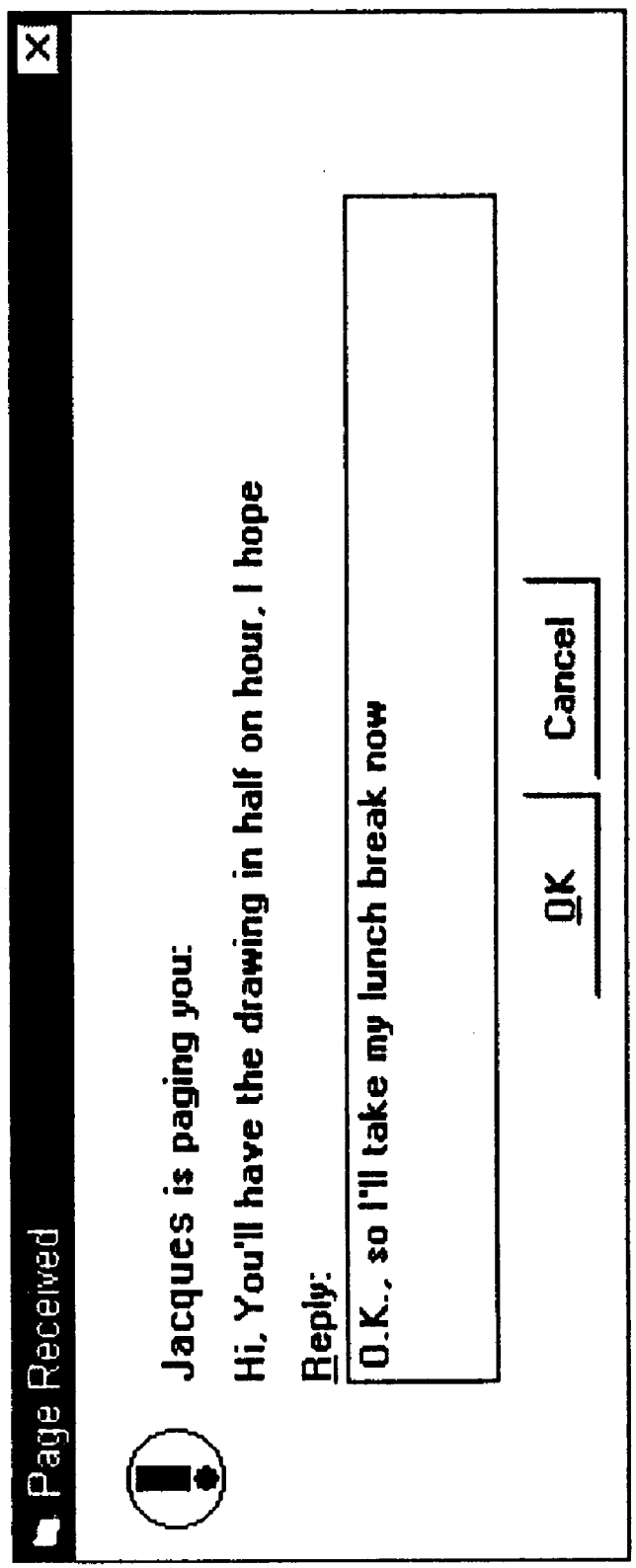

In the course of his work, Jacques requests the system to display a list of on-line users and in response, the system generates a screen display such as that of FIG. 12. Jacques notices that Udi is on-line and selects Udi on the screen display of FIG. 12 in order to initiate an on-line chat. In the chat, Jacques informs Udi that he will soon finish his part of the drawings. The chat is represented by the screen displays of FIGS. 13–14 which are seen by Jacques and Udi respectively.

Figure 15:
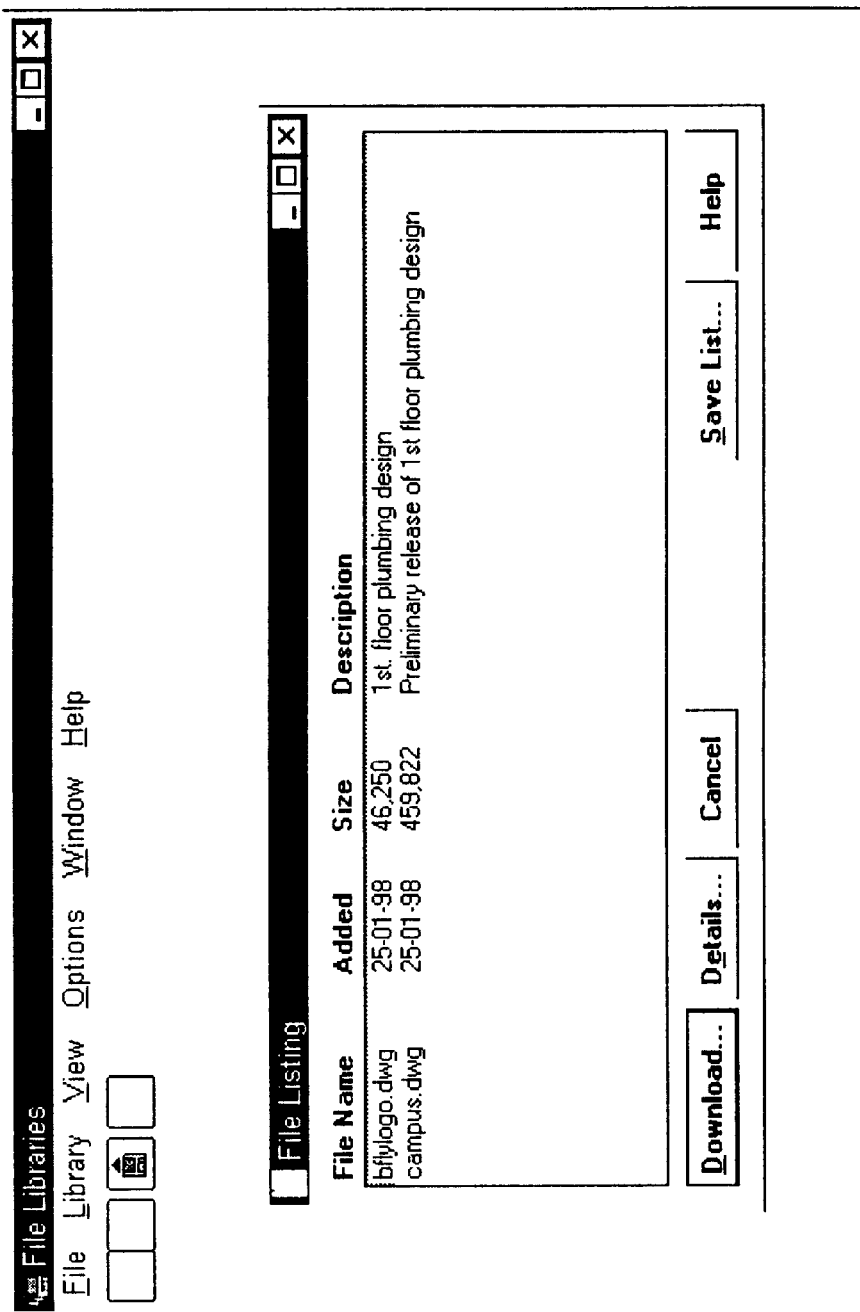
Figure 16:
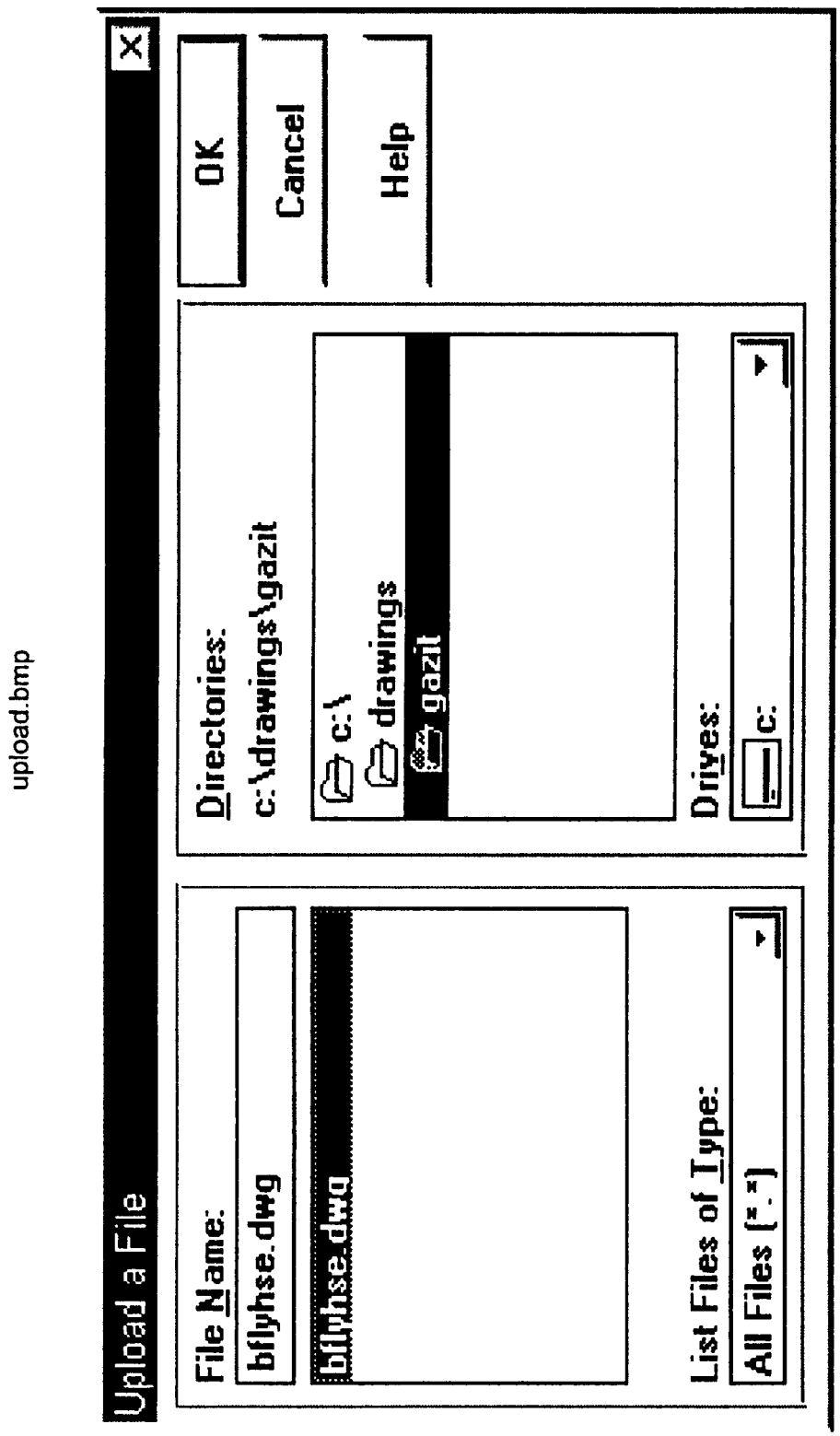
Figure 17:
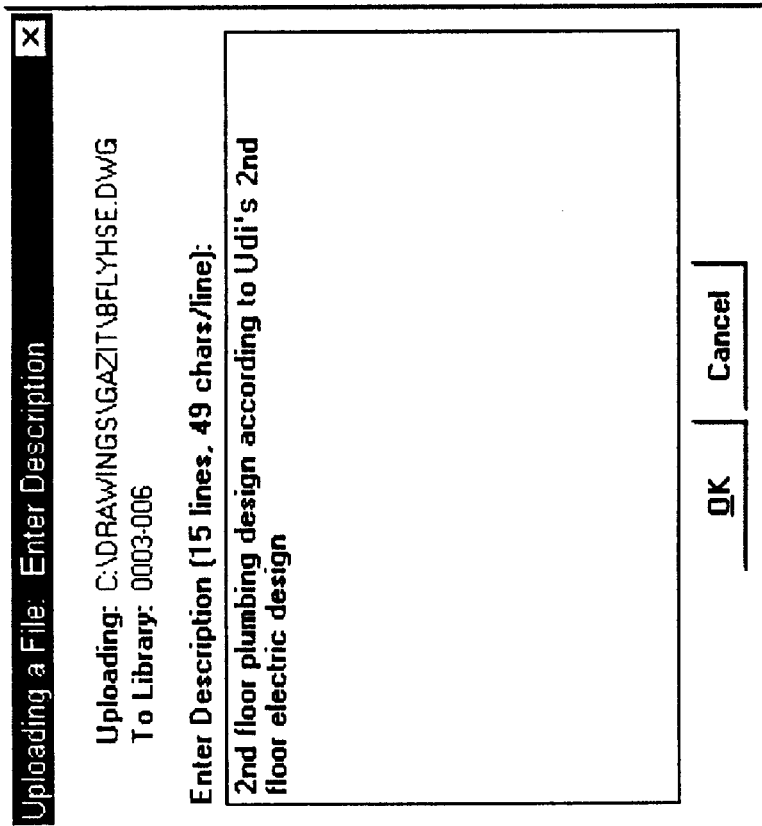
Figure 18:
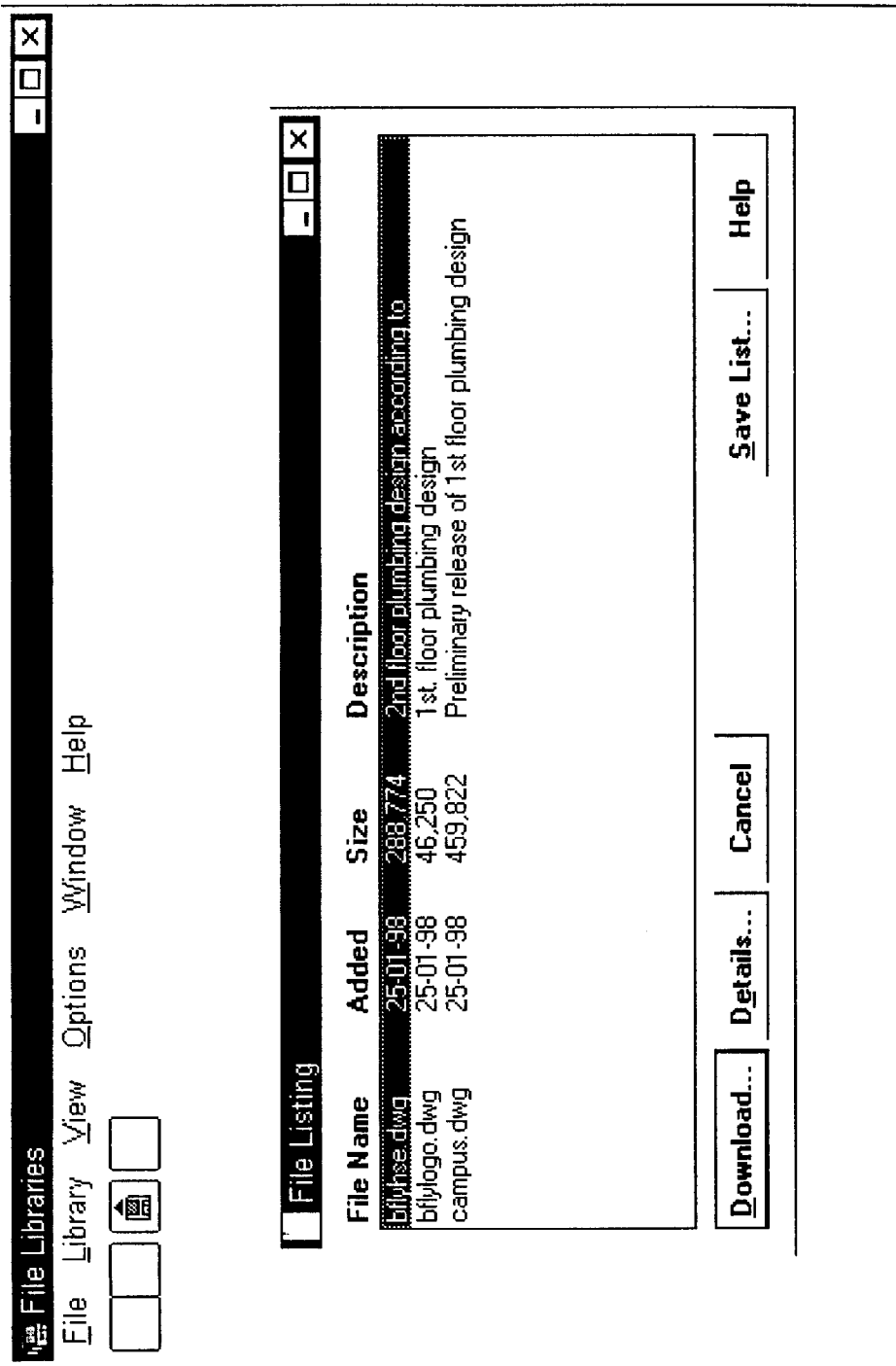

In step 210, Jacques, who has finished working on the drawings, enters an upload command (FIG. 8) with respect to the modified drawing file. The system automatically uploads the modified drawing file into Jacques's "Gazit—building No. 211" project drawer (the fifth drawer in FIG. 8). FIG. 15 is a screen display illustrating the contents of Jacques's drawer before the upload. FIG. 16 is a screen display which may appear responsive to Jacques' clicking the "upload" button in FIG. 8. The screen display of FIG. 16 allows Jacques to select the file to be uploaded. FIG. 17 which appears after Jacques selects and OKs in FIG. 16, is a screen display which allows Jacques to add descriptive text (step 220). The descriptive text added by Jacques may, for example, state: "2nd floor plumbing design according to Udi's second floor electric design". FIG. 18 is a screen display illustrating the contents of Jacques's drawer after the upload.

In step 230, Jacques elects to send e-mail and selects the e-mail option and Udi as recipient from the directory display of FIG. 8. In the illustrated embodiment, this is done by clicking on the envelope to the left of Udi's drawer in FIG. 8.

Figure 19:
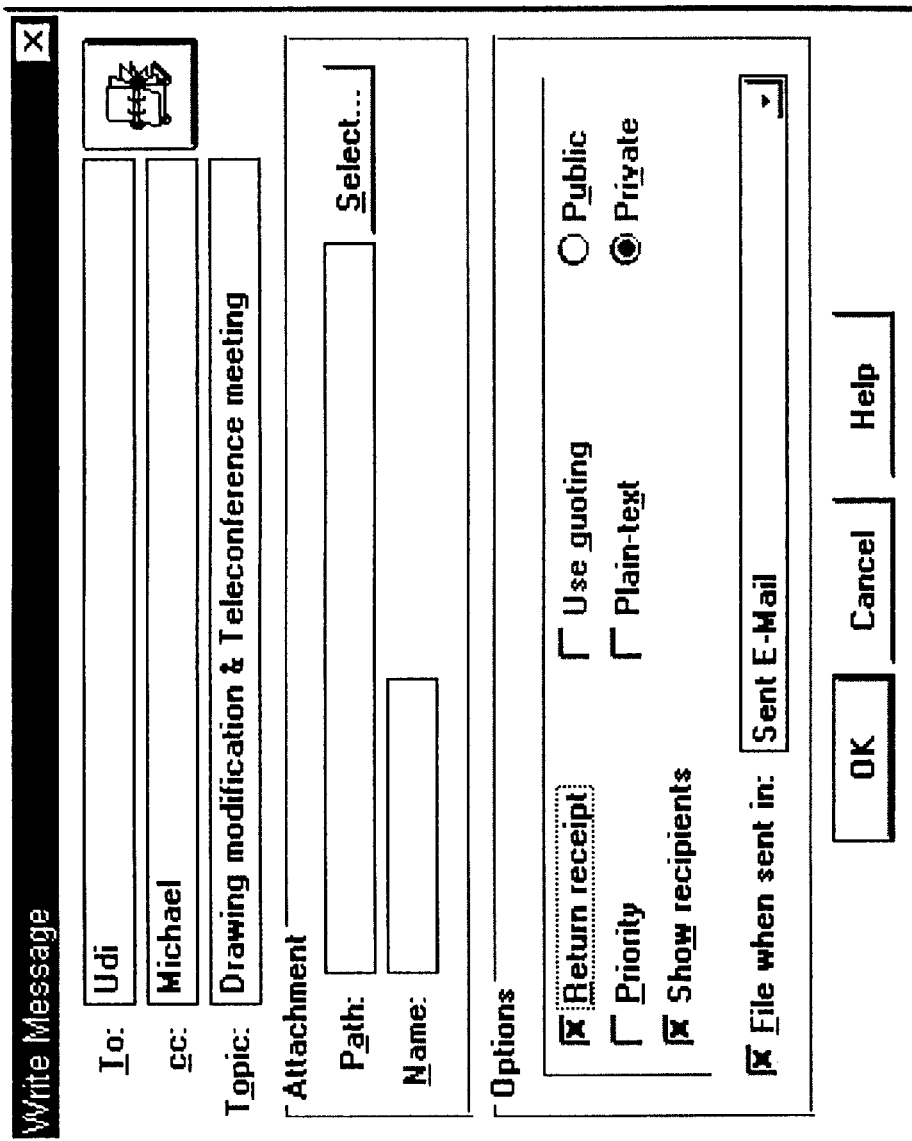
Figure 20:
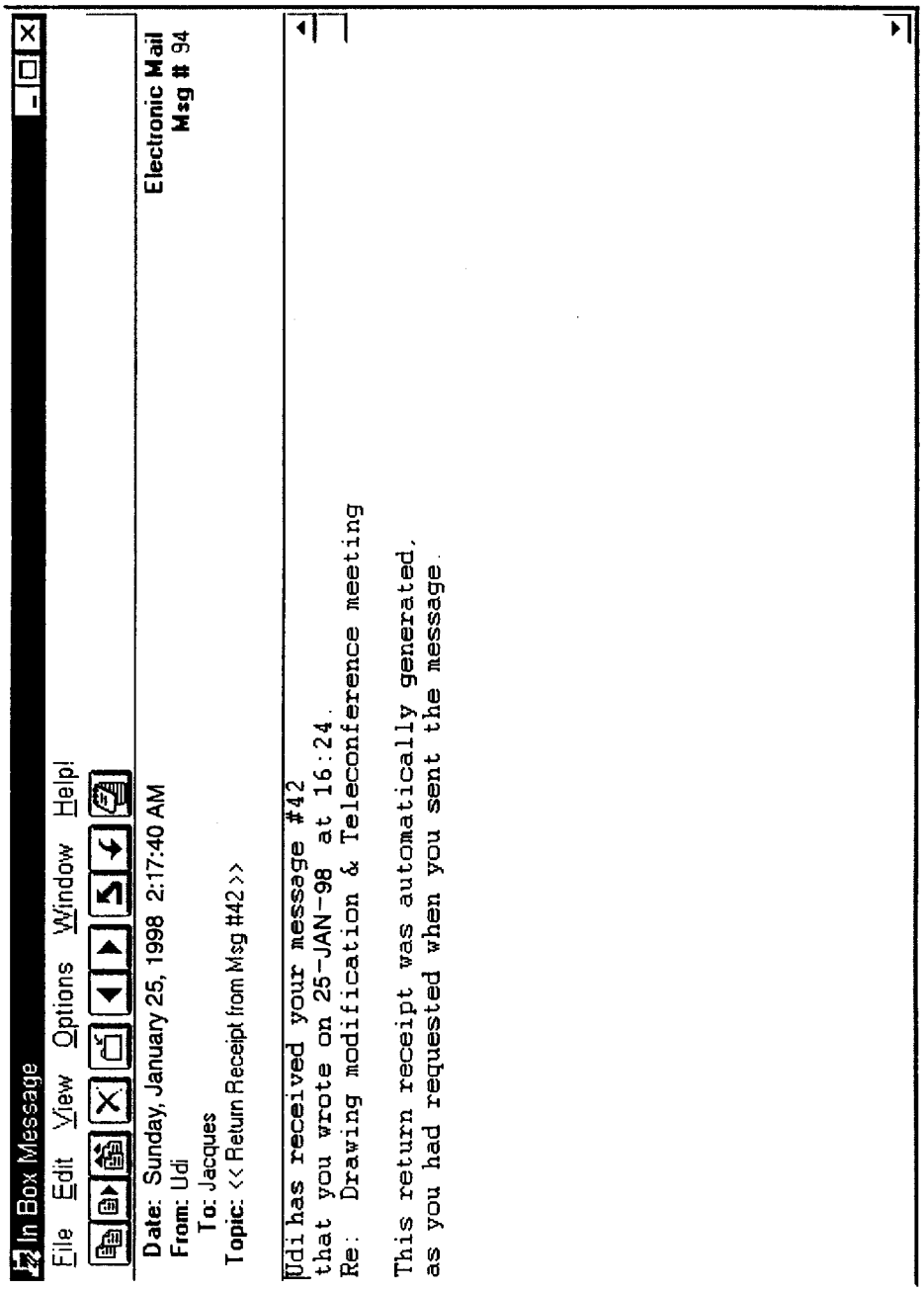

In step 240, Jacques sends e-mail to Udi, cc to Michael, saying that the drawings have been modified and suggesting a teleconference between Jacques, Udi and Michael about the modifications in two hour's time. FIG. 19 is a screen display which Jacques may use in writing the message to Udi. Since Jacques has selected (x'ed) the "return receipt" option, the system's communication manager confirms to Jacques that the e-mail has been downloaded by Michael (not shown) and by Udi, generating a suitable screen display such as the screen display of FIG. 20.

Figure 21:
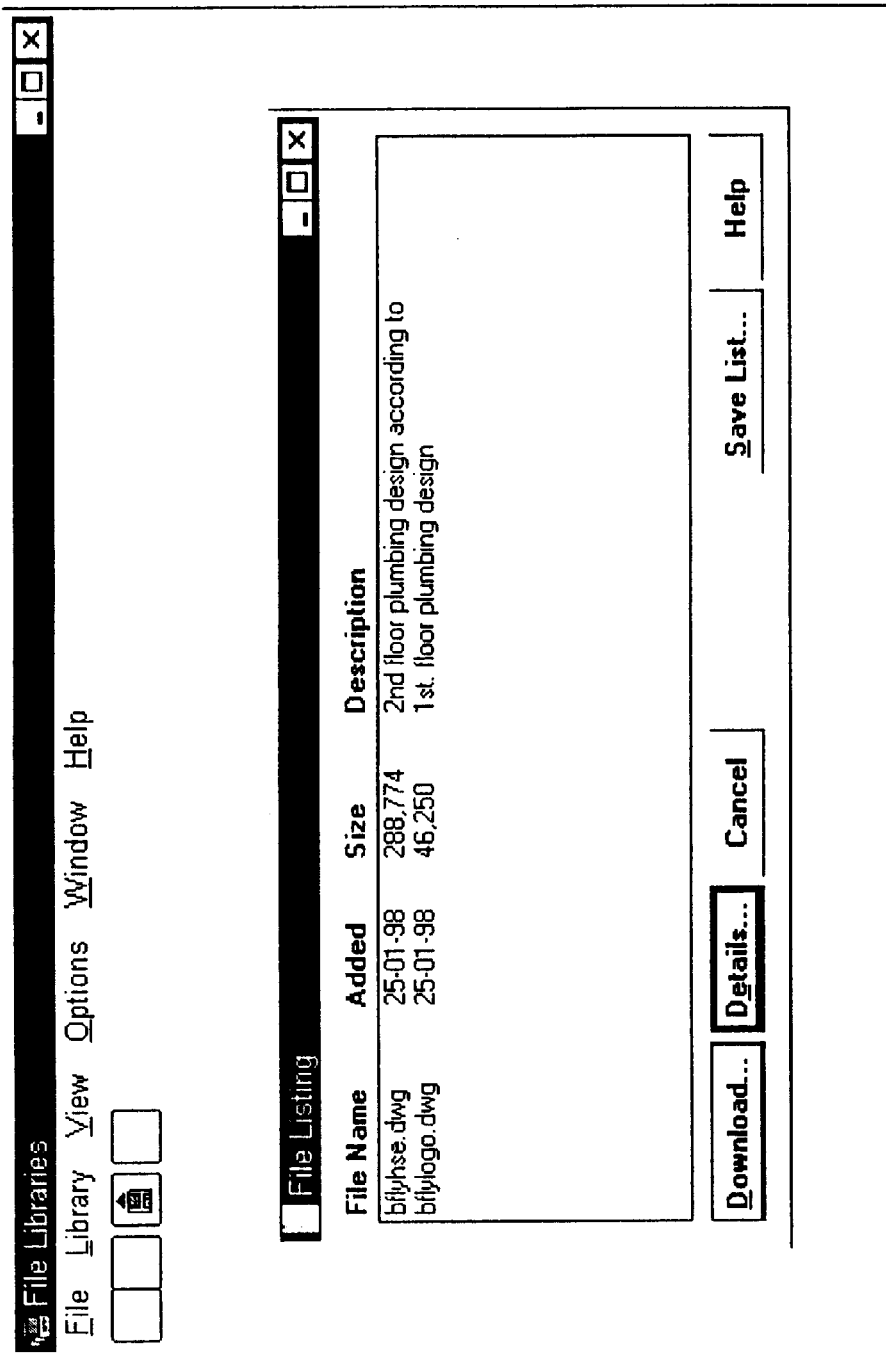
Figure 22:
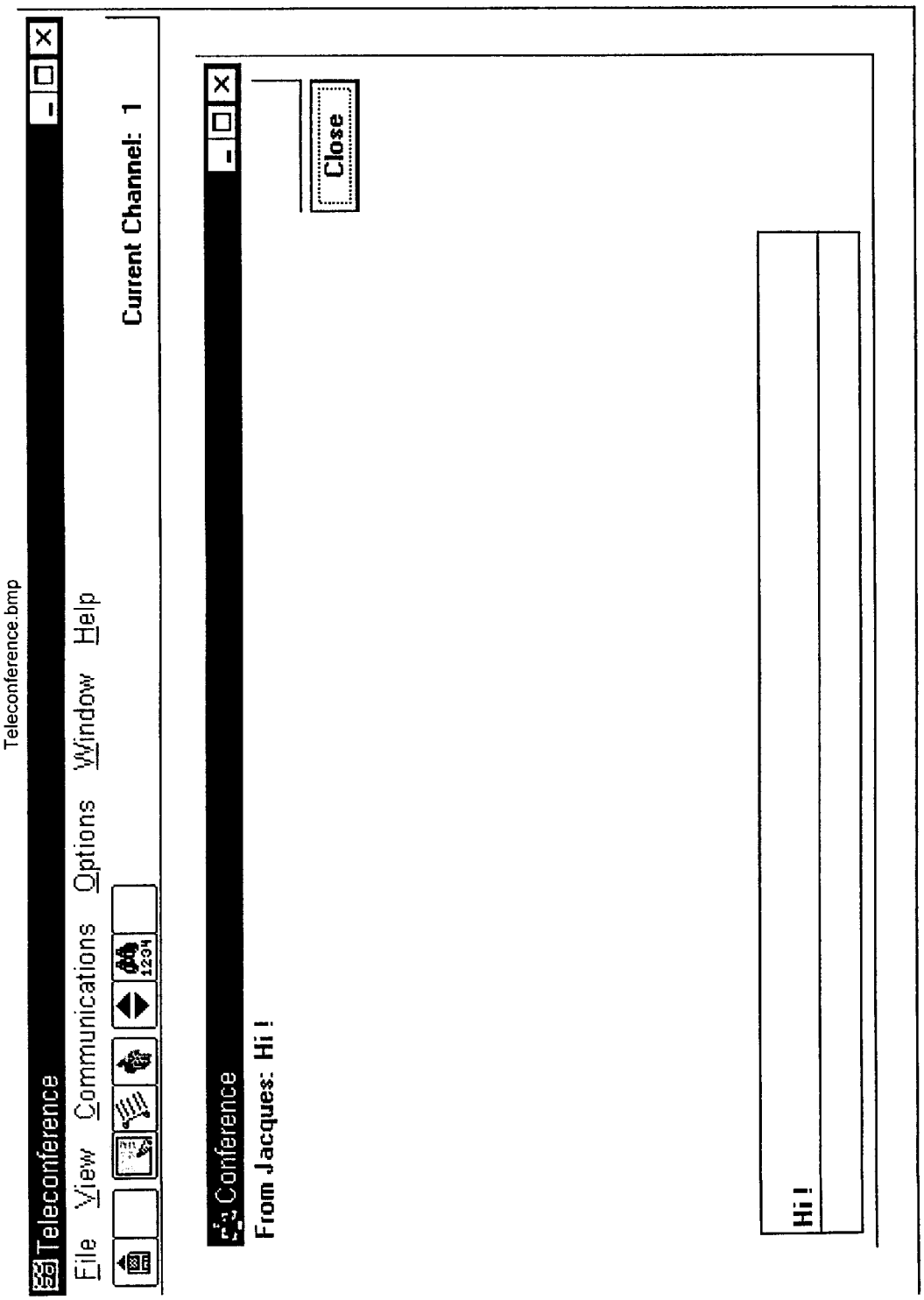

In step 265, Jacques elects to "clean up" his drawer by deleting a file which is obsolete because it contains a preliminary release of a first floor plumbing design whereas the revised or final first floor plumbing design is itself already in the drawer. Optionally, the project manager's authorization is required for deletions. FIG. 21 is a screen display of the files in Jacques drawer after Jacques has "cleaned up". In the illustrated embodiment, the "delete" button becomes visible when the "details" button is clicked in the screen display of FIG. 15.

In step 270, Jacques enters the general forum for the Building 211 project (using the Building 211 Forum button on the screen display of FIG. 8), searches for discussion topics including the key word "vacation" and finds out that it is customary to inform all other project participants of impending vacation.

In step 280, Jacques mass-mails (using the Mass-mailing button in the screen display of FIG. 8) to all users in the "Gazit—building no. 211" project that he is going on vacation for the next 3 days.

In step 290, the communication manager confirms to Jacques that e-mail has been received by all users in the Building 211 project.

In step 300, Jacques, Udi and Michael notice that it is time for the teleconference or are informed by a mutual scheduler in the system that the time has arrived. Jacques, Udi and Michael each press the Project Teleconference button in the screen display of FIG. 8 and enter into a teleconference in which screen displays may, for example, resemble the screen display of FIG. 22.

During the teleconference (step 310), Jacques imports one of the modified drawings from his drawer onto a viewer visible to all participants. Udi points at or zooms to or redlines a portion of the drawing and suggests a change there. The display screens for Jacques and Michael focus on the portion pointed at/zoomed to/redlined by Udi. Michael rejects the change on-line.

Figure 23:
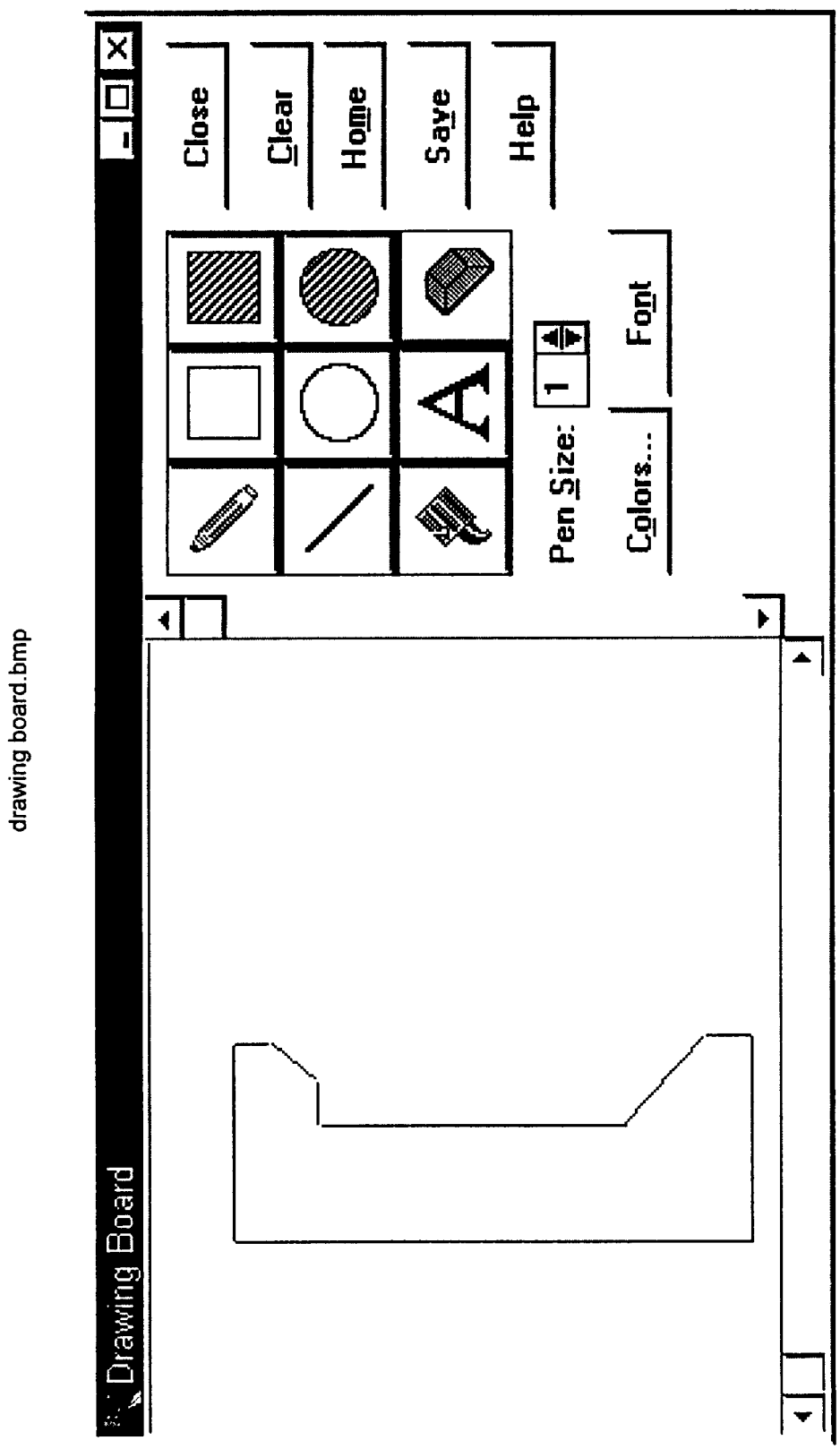
Figure 24:
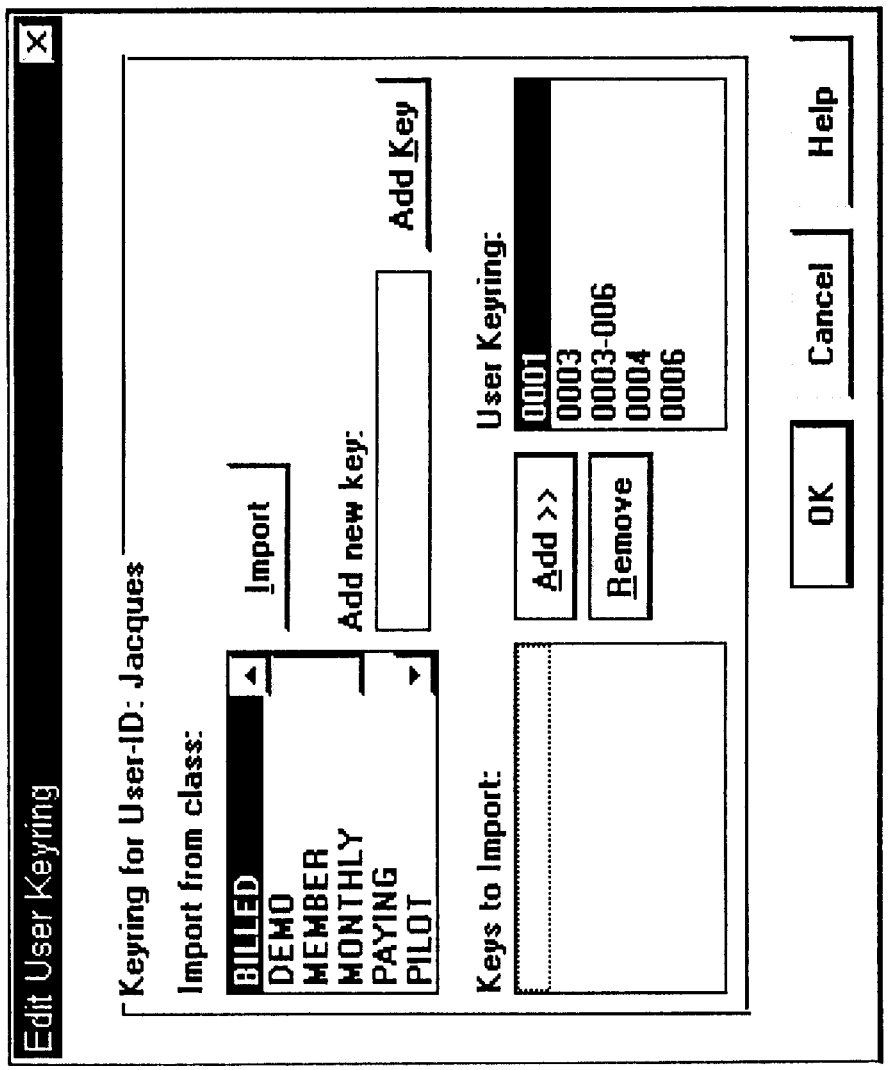
Figure 25:
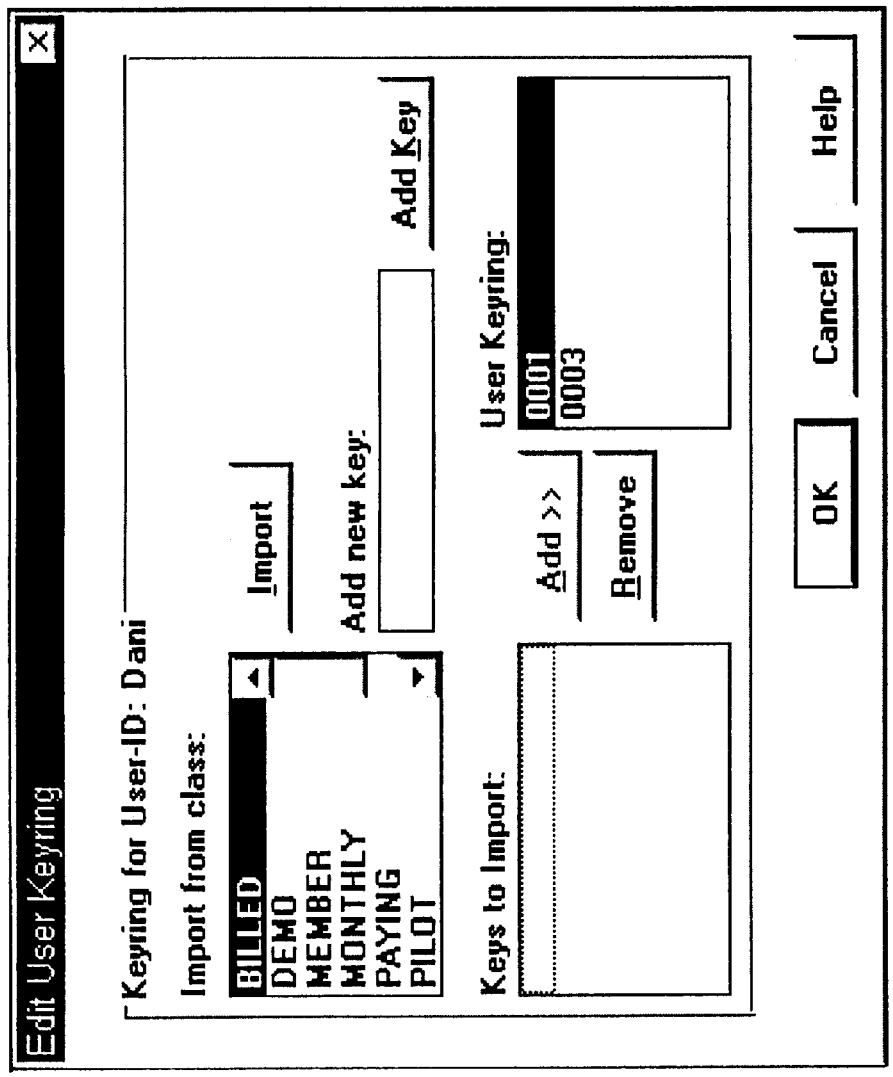
Figure 26:
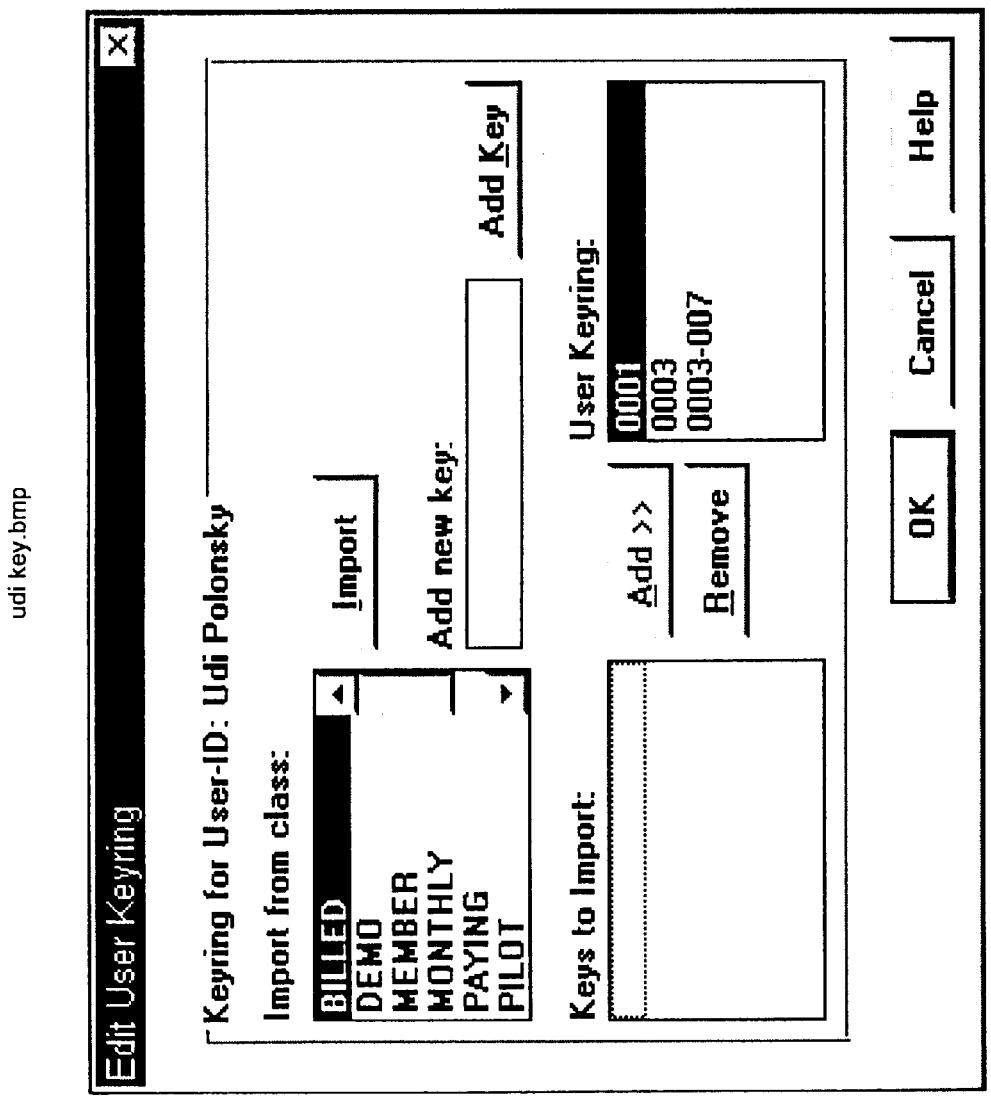
Figure 27:
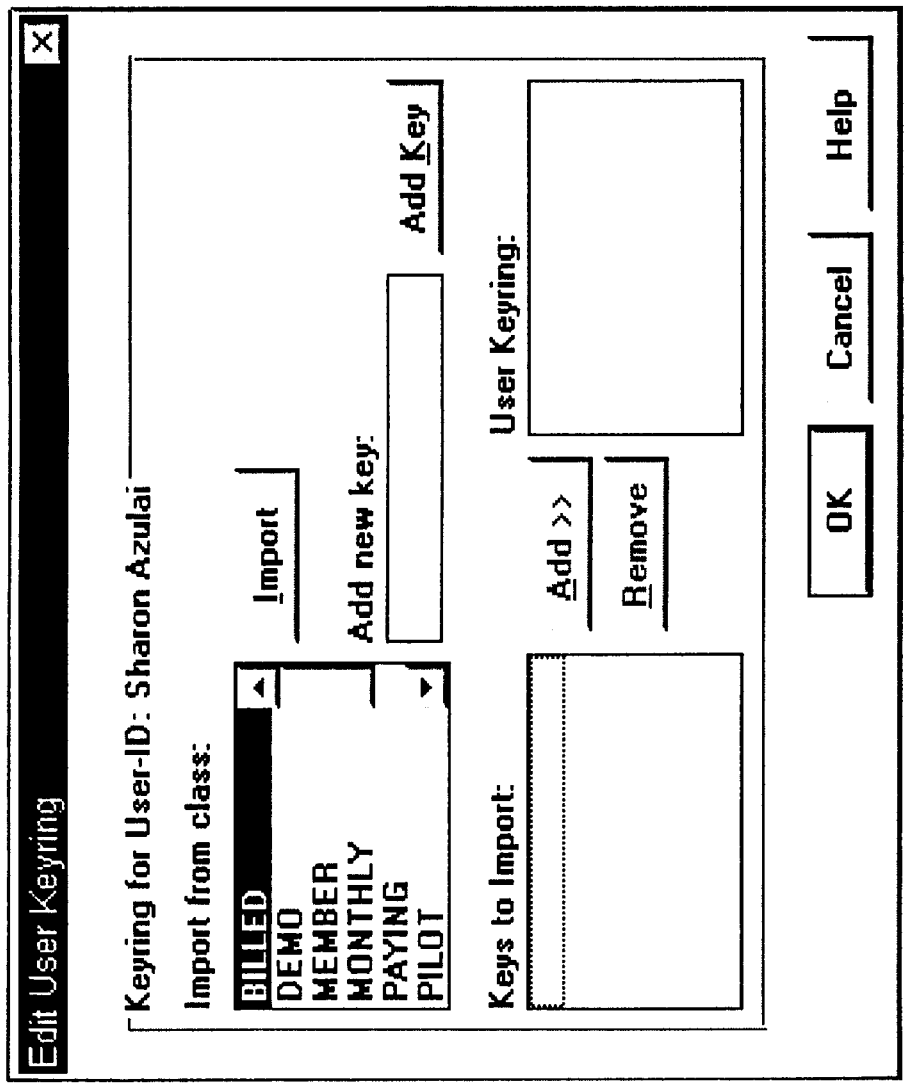
Figure 28:
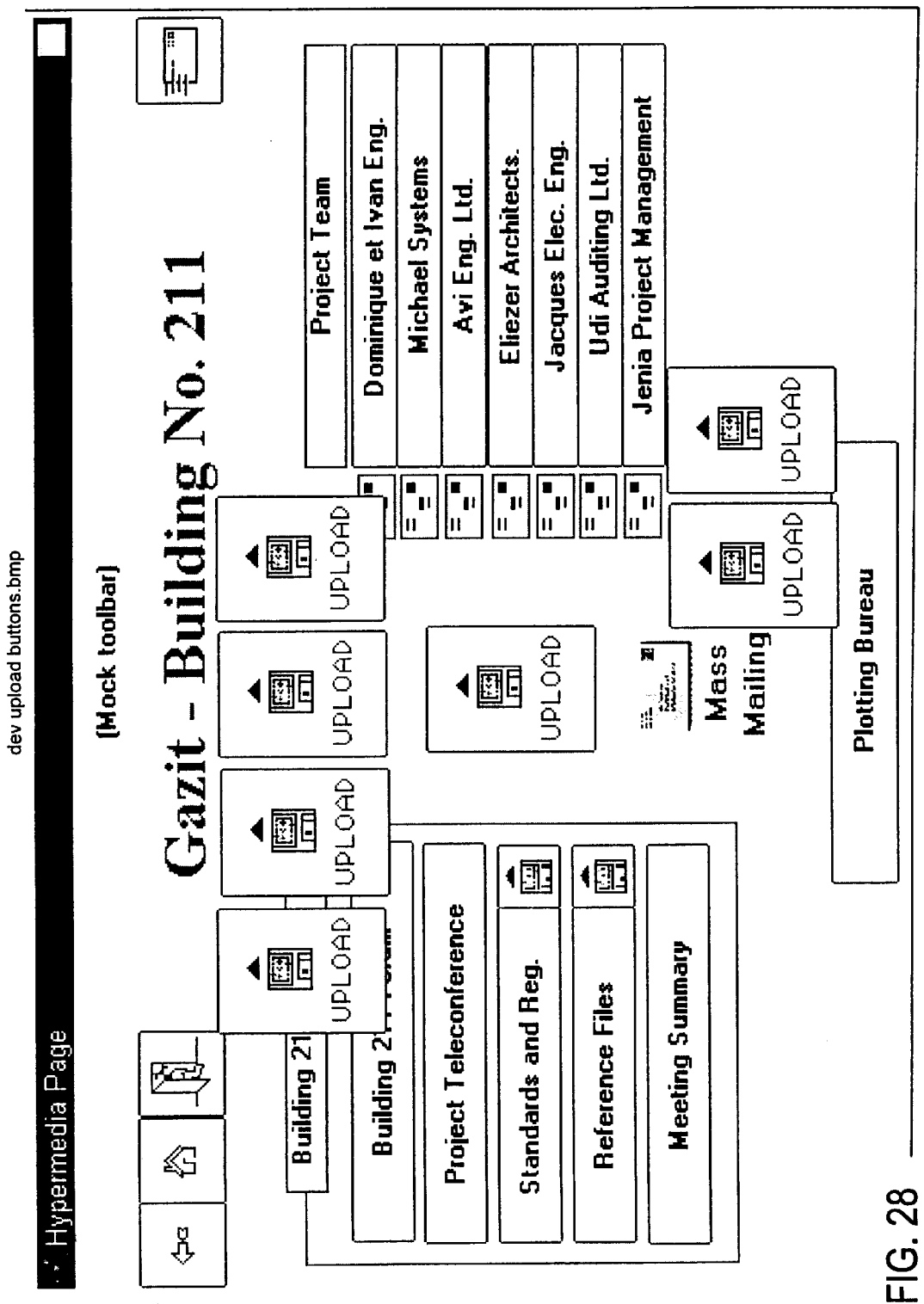

Also during the teleconference (step 315), Michael uses a drawing board visible to all participants and illustrated in FIG. 23, to sketch, in vertical cross-section, a pillar that he thinks will be useful for future designs.

In step 320, Jacques suggests that Udi send a communication to the plotting bureau asking the bureau to plot the results of teleconference (modified drawings with Udi's deletion). Udi replies that he cannot see any Plotting Bureau button so Jacques, who does see a plotting bureau button, volunteers to send modified drawings. It is appreciated that typically, only users who are authorized to send materials to the plotting bureau have a visible plotting bureau button. Therefore, if Udi is not so authorized, the Plotting Bureau button in FIG. 8 is omitted from the screen display of FIG. 8 as seen by Udi.

The plotting bureau is typically not a participant in any project but instead is merely a slave or recipient of files from project participants.

According to a preferred embodiment of the present invention, a user can connect to the system using a plurality of communication modes such as the following 3 user-selectable communication modes: direct dial-up; dial-up via a local telephone service provider's gateway; and Internet.

Figure 30:
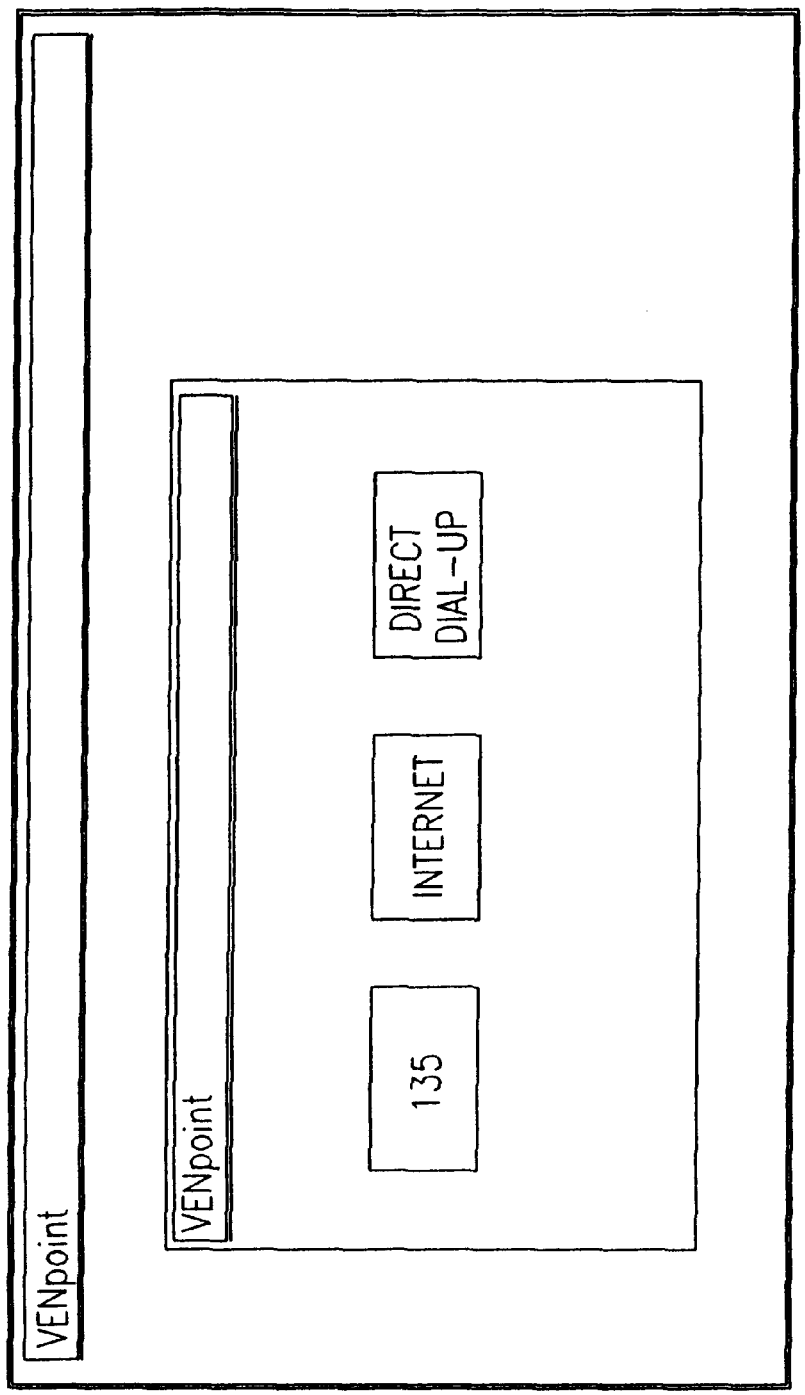

FIG. 30 is a screen display which may be generated on the user's terminal before the login screen display of FIG. 3 which allows a user to select one of the above communication modes where "135" is the local telephone number of the gateway of the telephone service provider.

Preferably, the data flow scheme of the system is at least partly system defined. Optionally, the data flow scheme for each individual project is custom-defined.

A preferred method for implementing an uploading scheme in which each user uploads only to his own drawer, is now described with reference to FIGS. 24–30. The method is implemented using the HyperMedia Editor of Galacticom's WorldGroup software, however it is appreciated that alternatively, other software may be employed.

It is appreciated that the method described herein allows different data flow schemes to be defined for different projects.

As shown, for each project, a plurality of upload buttons is defined corresponding in number to the plurality of drawers defined for the project, i.e. to the number of participants in the project. In the illustrated example, there are seven participants in the "Gazit—Building No. 211" project (Jacques, Udi, and 5 others, whose drawers are illustrated in FIG. 8). The same bitmap (e.g. BMP) file is associated with each button and each button is the same size.

Authorization keys are associated with the buttons. These keys are selected from among authorization keys ("user keyring") assigned to each of the participants and sometimes to other entities who have access rights to the project but do not have drawers, such as, in the illustrated example, a quality control expert called Dani. Still other entities, like Sharon in the illustrated example, do not have access rights to any project and therefore do not possess any authorization keys to any project. These entities are, however, part of the virtual community and can preferably act within the system in different ways such as but not limited to some or all of the following ways:

a. receive services from dealers and supplies,
b. download software and data (such as regulations and designing standards) from resource file libraries serving the virtual community,
c. participate in discussion forums, and
d. send and receive messages to/from other members of the virtual community or to/from Internet subscribers, either by Internet e-mail or by internal system e-mail.

A particular advantage of using internal system e-mail is that preferably, the system assigns each member of the virtual community an internal system address which is convenient and clearly indicative of the addressee and is preferably selected by the addressee. This feature is not always provided by conventional ISPs. For example, the internal system addresses may be in a foreign alphabet if the language of the virtual community is a language, like Hebrew, which does not use the English alphabet.

Typically, each participant has an authorization key which is not held by any other participant or entity and, for each participant, there is a button having his authorization key. The participant's drawer has an ID which corresponds to this authorization key. The action associated with that button is the action of uploading to the relevant participant's drawer.

Figure 29:
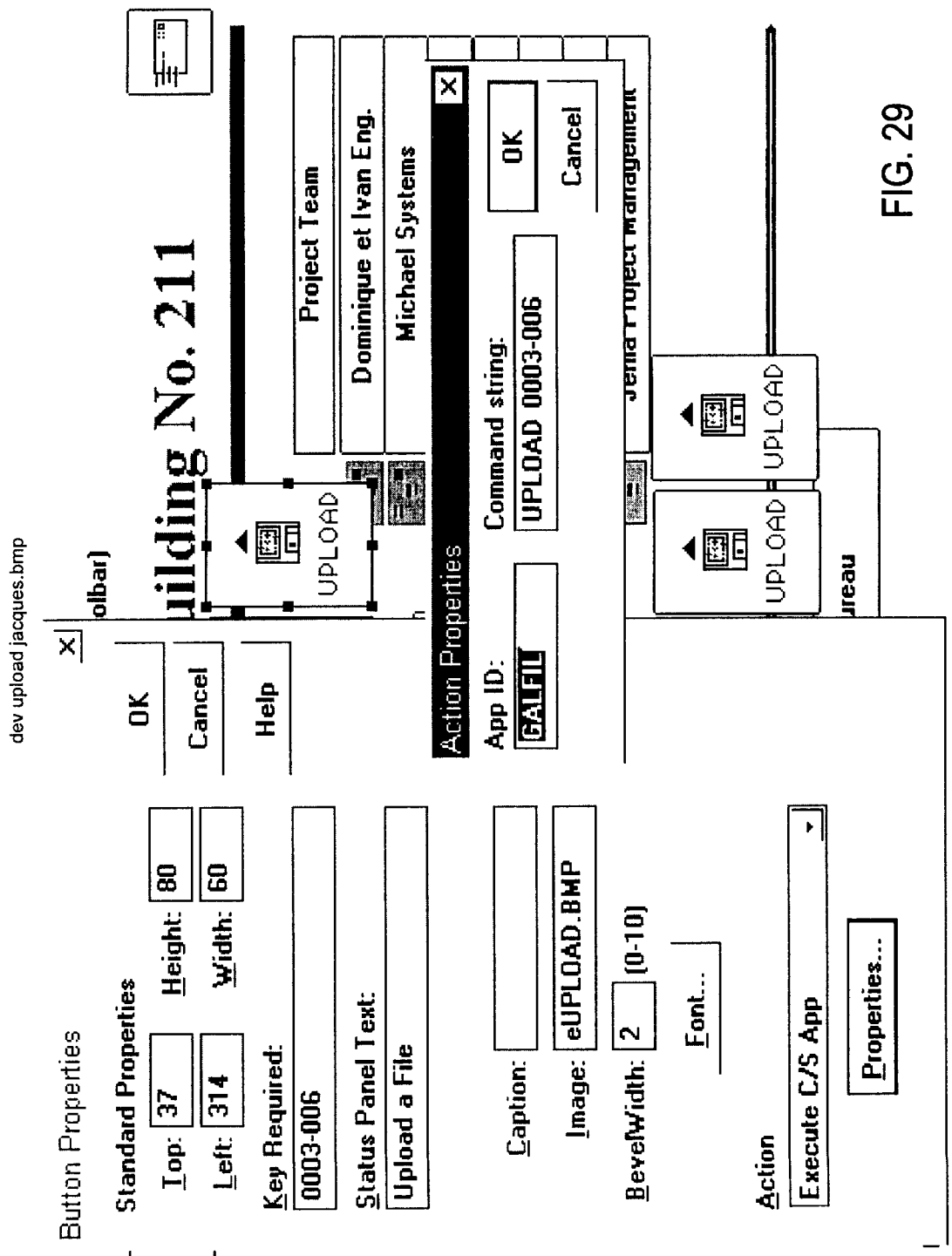

For example, in FIG. 29, the following command is being associated with one of the seven buttons: "upload 0003-006", i.e. upload a file to the drawer whose ID is 0003-006. As may be appreciated from comparing the user keyrings in FIGS. 24 (Jacques), 25 (Dani), 26 (Udi) and 27 (Sharon), only Jacques has the 0003-006 key and therefore, only Jacques can upload to the drawer whose ID is 0003-006 which is therefore considered Jacques's drawer.

A participant typically sees only the button/s which he is authorized to use and does not see buttons which do not have any of his authorization keys. The plurality of buttons are preferably all located at a single location, as shown in FIG. 8 in which only a single Upload button is visible. This preferred implementation conserves space and as a result, the plurality of buttons behave and appear, to each participant, like a single button for uploading to that participant's drawer.

It is appreciated that the software components of the present invention may, if desired, be implemented in ROM (read-only memory) form. The software components may, generally, be implemented in hardware, if desired, using conventional techniques.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

We claim:

1. A computerized communication system for managing a multidisciplinary engineering virtual community engaged in a plurality of projects, the system comprising:

a directory display operative to display a directory of participants in a project to a user who has entered a project in which he is participating; and a communication manager operative to transmit a communication between the user and at least an individual one of the participants in said directory, in response to selection of at least one of the participants in the directory by said user, wherein one of the participants is a plotting bureau and wherein different participants have different levels of authorization regarding communications with the plotting bureau and wherein the communication manager is operative to transmit a particular communication from a particular participant to the plotting bureau only if the particular participant is authorized to transmit said particular communication.

2. A system according to claim 1 wherein the communicator is operative to transmit a communication from the user to a selected one of the participants.

3. A system according to claim 2 wherein said communication comprises an electronic mail communication.

4. A system according to claim 1 wherein the communicator is operative to transmit a communication from a selected one of the participants to the user.

5. A system according to claim 4 wherein the communication is transmitted by providing the user with access to a drawer of the selected one of the participants.

6. A computerized communication system for managing a multidisciplinary engineering virtual community engaged in a plurality of projects, the system comprising:

an archive including a plurality of drawers associated with each of a plurality of users;

an uploader operative to upload a file generated by an individual user only to the drawer associated with the individual user; and a downloader operative to download a file from any individual one of the plurality of drawers, wherein said uploader includes a file identifier operative to associate a descriptive text generated by a user with an individual file to be uploaded, thereby to allow a user to generate a descriptive text including a description characterizing the individual file to be uploaded.

7. A system according to claim 6 wherein the archive includes project archives for each of at least two projects, each project archive including a plurality of drawers for each of a corresponding plurality of participants in the project, and wherein the downloader is operative to download a file from a drawer within a project archive of a particular project only upon request of a participant in said particular project.

8. A system according to claim 1 wherein said directory comprises an indication of functions fulfilled by each participant in the project.

9. A system according to claim 1 and also comprising an authorization facility authorizing only users participating in a project to enter that project.

10. A system according to claim 1 wherein the communication manager is also operative to transmit a communication from the user to all of the participants in said directory, in response to a mass-mailing command by the user.

11. A system according to claim 1 wherein the communication manager is operative to transmit technical drawings of substantially any commonly used size, by electronic mail.

12. A system according to claim 3 wherein said communication manager comprises a receipt confirmation generator operative to provide an indication to the user that the selected participant has received the electronic mail communication.

13. A system according to claim 1 wherein said communication manager is implemented in software and said participant uses participant software and wherein said communication manager is operative to push updates of at least some software elements toward each individual one of the participants such that, upon termination of contact between the communication manager and any participant, said participant's software elements are as updated as the communication manager's software elements.

14. A system according to claim 6 and also comprising at least one forum in which participants raise discussion topics and receive responses from one another and wherein said forum includes a search engine enabling an individual participant to search the discussion topics and responses according to a participant-defined search key.

15. A system according to claim 1 wherein said communication manager comprises a teleconferencing manager.

16. A system according to claim 15 wherein said teleconferencing manager is operative to provide a drawing board for an individual teleconference and wherein the participants in the individual teleconference all draw on said drawing board during the teleconference and wherein a drawing made on said drawing board by any one participant during the teleconference is seen on-line by the other participants during the teleconference.

17. A system according to claim 1 wherein the communication manager operates in accordance with a user-selected one of the following communication modes:

direct dial-up;

dial-up via a local telephone service provider's gateway; and

Internet.

18. A system according to claim 1 wherein the display is also operative to display an indication of at least a portion of the members of the virtual community who are currently on-line and wherein the communication manager is operative to set up a chat session between the use and an individual member of the virtual community who is currently on-line, in response to selection of the individual member by said user.

19. A system according to claim 1 which is formed of a platform having at least two cooperating modules.

20. A system according to claim 4 wherein said communication comprises an electronic mail communication.

21. A system according to claim 9 wherein said authorization facility comprises a flexible authorization facility which is modifiable by a system operator to implement different authorization schemes for different projects.

22. A system according to claim 1 wherein said communication manager is operative to provide electronic mail service allowing a user of the system who is not an Internet subscriber to communicate back and forth with an individual who is an Internet subscriber but is not a user of the system.

23. A system according to claim 1 and also comprising a library of computerized resources accessible by all members of the virtual community.

24. A system according to claim 6 which is based on client server architecture.

25. A system according to claim 6 wherein the downloader is operative, in the event of disconnection while downloading a file and subsequent reconnection, to download, following the reconnection, only portions of the file which were not downloaded before the disconnection.

26. A computerized communication system for managing a multidisciplinary engineering virtual community engaged in a plurality of projects, the system comprising:

an archive including a plurality of drawers for each of a plurality of users; and a data flow controller operative to govern traffic of files to the drawers in accordance with a data flow scheme.

27. A system according to claim 26 wherein the data flow scheme is system-defined.

28. A system according to claim 26 wherein the data flow scheme for each individual project is custom-defined.

29. A system according to claim 1 which is based on client server architecture.

30. A system according to claim 6 which is formed of a platform having at least two cooperating modules.

31. A system according to claim 1 and also comprising an authorization facility operative to control access to the system.

32. A system according to claim 6 and also comprising an authorization facility operative to control access to the system.

33. A system according to claim 6 wherein said directory comprises an indication of functions fulfilled by each participant in the project.

34. A system according to claim 6 and also comprising an authorization facility authorizing only users participating in a project to enter that project.

35. A system according to claim 9 wherein said authorization facility is operative to display a menu of projects to users including, for each user, only projects in which the user is participating.

36. A system according to claim 34 wherein said authorization facility is operative to display a menu of projects to users including, for each user, only projects in which the user is participating.

37. A system according to claim 6 wherein said communication manager is implemented in software and said participant uses participant software and wherein said communication manager is operative to push updates of at least some software elements toward each individual one of the participants such that, upon termination of contact between the communication manager and any participant, said participant's software elements are as updated as the communication manager's software elements.

38. A system according to claim 1 and also comprising at least one forum in which participants raise discussion topics and receive responses from one another and wherein said forum includes a search engine enabling an individual participant to search the discussion topics and responses according to a participant-defined search key.

39. A system according to claim 6 wherein the communication manager operates in accordance with a user-selected one of the following communication modes:

direct dial-up;

dial-up via a local telephone service provider's gateway; and

Internet.

40. A system according to claim 6 wherein the display is also operative to display an indication of at least a portion of the members of the virtual community who are currently on-line and wherein the communication manager is operative to set up a chat session between the use and an individual member of the virtual community who is currently on-line, in response to selection of the individual member by said user.

41. A system according to claim 6 wherein said communication manager is operative to provide electronic mail service allowing a user of the system who is not an Internet subscriber to communicate back and forth with an individual who is an Internet subscriber but is not a user of the system.

42. A system according to claim 6 and also comprising a library of computerized resources accessible by all members of the virtual community.

43. A computerized communication system for managing a multidisciplinary engineering virtual community engaged in a plurality of projects, said community comprising a plurality of participants, the system comprising:

an archive including a plurality of drawers associated with each of a plurality of users;

an uploader operative to upload a file generated by an individual user only to the drawer associated with the individual user; and a downloader operative to download a file from any individual one of the plurality of drawers, wherein one of the participants is a plotting bureau and wherein different participants have different levels of authorization regarding communications with the plotting bureau and wherein the communication manager is operative to transmit a particular communication from a particular participant to the plotting bureau only if the particular participant is authorized to transmit said particular communication.

44. A system according to claim 43 wherein the archive includes project archives for each of at least two projects, each project archive including a plurality of drawers for each of a corresponding plurality of participants in the project, and wherein the downloader is operative to download a file from a drawer within a project archive of a particular project only upon request of a participant in said particular project.

45. A system according to claim 43 and also comprising at least one forum in which participants raise discussion topics and receive responses from one another and wherein said forum includes a search engine enabling an individual participant to search the discussion topics and responses according to a participant-defined search key.

46. A system according to claim 43 wherein the uploader includes a file identifier operative to associate a descriptive text generated by a user with an individual file to be uploaded, thereby to allow a user to generate a descriptive text including a description characterizing the individual file to be uploaded.

47. A system according to claim 43 which is based on client server architecture.

48. A system according to claim 43 wherein the downloader is operative, in the event of disconnection while downloading a file and subsequent reconnection, to download, following the reconnection, only portions of the file which were not downloaded before the disconnection.

49. A system according to claim 43 which is formed of a platform having at least two cooperating modules.

50. A system according to claim 43 and also comprising an authorization facility operative to control access to the system.

51. A system according to claim 43 wherein said directory comprises an indication of functions fulfilled by each participant in the project.

52. A system according to claim 43 and also comprising an authorization facility authorizing only users participating in a project to enter that project.

53. A system according to claim 52 wherein said authorization facility is operative to display a menu of projects to users including, for each user, only projects in which the user is participating.

54. A system according to claim 43 wherein said communication manager is implemented in software and said participant uses participant software and where in said communication manager is operative to push updates of at least some software elements toward each individual one of the participants such that, upon termination of contact between the communication manager and any participant, said participant's software elements are as updated as the communication manager's software elements.

55. A system according to claim 43 wherein the communication manager operates in accordance with a user-selected one of the following communication modes:

direct dial-up;

dial-up via a local telephone service provider's gateway; and

Internet.

56. A system according to claim 43 wherein the display is also operative to display an indication of at least a portion of the members of the virtual community who are currently on-line and wherein the communication manager is operative to set up a chat session between the use and an individual member of the virtual community who is currently on-line, in response to selection of the individual member by said user.

57. A system according to claim 43 wherein said communication manager is operative to provide electronic mail service allowing a user of the system who is not an Internet subscriber to communicate back and forth with an individual who is an Internet subscriber but is not a user of the system.

58. A system according to claim 43 and also comprising a library of computerized resources accessible by all members of the virtual community.

* * * * *